(12) United States Patent
Lackner et al.

(10) Patent No.: US 12,722,113 B2
(45) Date of Patent: Sep. 1, 2026

(54) DEVICE AND METHOD FOR PASSIVE CARBON DIOXIDE COLLECTION WITH SUSPENDED SORBENT DISKS

(71) Applicant: ARIZONA BOARD OF REGENTS ON BEHALF OF ARIZONA STATE UNIVERSITY, Scottsdale, AZ (US)

(72) Inventors: Klaus Lackner, Longmont, CO (US); Robert Page, Phoenix, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 605 days.

(21) Appl. No.: 18/254,980

(22) PCT Filed: Nov. 30, 2021

(86) PCT No.: PCT/US2021/061203
§ 371 (c)(1),
(2) Date: May 30, 2023

(87) PCT Pub. No.: WO2022/115785
PCT Pub. Date: Jun. 2, 2022

(65) Prior Publication Data

US 2023/0415090 A1 Dec. 28, 2023

Related U.S. Application Data

(60) Provisional application No. 63/119,306, filed on Nov. 30, 2020.

(51) Int. Cl.
*B01D 53/04* (2006.01)

(52) U.S. Cl.
CPC ..... *B01D 53/0423* (2013.01); *B01D 53/0454* (2013.01); *B01D 2257/504* (2013.01)

(58) Field of Classification Search
CPC ............ B01D 53/0423; B01D 53/0454; B01D 2257/504; B01D 53/02; B01D 53/04;
(Continued)

(56) References Cited

U.S. PATENT DOCUMENTS 4,801,308 A * 1/1989 Keefer ............... B01D 53/0407
95/138
5,350,513 A 9/1994 Markowitz
(Continued)

FOREIGN PATENT DOCUMENTS

| | | | |
|---|---|---|---|
| CN | 208562965 U | * | 3/2019 |
| WO | 2019165151 | | 8/2019 |
| WO | 2020092272 | | 5/2020 |

*Primary Examiner* — Qianping He
(74) *Attorney, Agent, or Firm* — FULLER IP LAW LLC; Rodney J. Fuller

(57) ABSTRACT

A passive $CO_2$ collection device is disclosed, including a release chamber and a capture structure having at least three straps and a plurality of sorbent disks coupled to and spaced along the straps. The capture structure is movable between collection and release configurations. Each strap has a primary and secondary width, the secondary width smaller than the primary. The collection configuration includes the disks suspended from a movable portion by the straps such that, for each pair of neighboring disks and for each strap, a lower disk is separated from an upper disk by a connecting segment, allowing the sorbent to capture carbon dioxide from an airflow. The release configuration includes the disks being stacked within the chamber for regeneration. Each connecting segment is in a release topology designed to accommodate stacking the disks within the chamber. The connecting segment is biased to move toward the release topology.

20 Claims, 15 Drawing Sheets

(58) Field of Classification Search

CPC ........ B01D 53/06; B01D 53/14; B01D 53/18; B01D 53/62; B01D 2258/06; B01D 53/0407; B01D 53/1475; B01D 53/83; B01D 53/0438; B01D 53/323; B01D 2259/40086; B01D 2259/4009; B01D 2253/102; B01D 2259/40083; B01D 53/261; B01D 53/96; B01D 46/0036; B01D 2253/20; B01D 46/00; B01D 46/0002; B01D 53/0462; B01D 2253/02; B01D 2313/40; B01D 2201/32; B01D 63/0822; Y02C 20/40

USPC .... 96/122, 121, 130, 154, 144, 151; 95/104, 95/93, 94, 139, 129, 154, 92; 55/361, 55/486, 518, 139, 519, 385

See application file for complete search history.

(56) References Cited

U.S. PATENT DOCUMENTS

| | | | | |
|---|---|---|---|---|
| 2006/0051274 | A1 | 3/2006 | Wright | |
| 2011/0189075 | A1* | 8/2011 | Wright | B01D 53/62 502/55 |
| 2015/0336044 | A1 | 11/2015 | Keith, II | |
| 2016/0074803 | A1 | 3/2016 | Gebald | |
| 2017/0361271 | A1 | 12/2017 | Eisenberger | |
| 2018/0169562 | A1 | 6/2018 | Hilbig | |
| 2021/0387133 | A1* | 12/2021 | Lackner | B01D 53/0454 |

* cited by examiner

DEVICE AND METHOD FOR PASSIVE CARBON DIOXIDE COLLECTION WITH SUSPENDED SORBENT DISKS

RELATED APPLICATIONS

This application is the U.S. National Stage of International Patent Application No. PCT/US2021/061203, filed Nov. 30, 2021, which claims the benefit of and priority to of U.S. provisional patent application No. 63/119,306, filed Nov. 30, 2020 titled "System and Method for Hanging the Disks of a carbon dioxide Capture Device,"," the contents of each of which are hereby incorporated by reference in their entireties.

TECHNICAL FIELD

Aspects of this document relate generally to passive carbon dioxide collection devices and methods.

BACKGROUND

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis. Nevertheless, the technologies are still new and the early air capture processes require large amounts of energy to operate. Since the carbon dioxide in the ambient air is very dilute, atmospheric carbon dioxide collectors can quickly overrun a tight energy budget for drawing in and processing air in bulk. Additionally, conventional carbon dioxide collection systems often exhibit the unfortunate combination of being costly and fragile. Conventional capture devices also often have a large initial capital cost along with a high operating cost.

SUMMARY

According to one aspect, a passive carbon dioxide collection device includes a release chamber and a capture structure coupled to the release chamber and having at least three straps and a plurality of disks coupled to and spaced along the at least three straps. Each disk has a sorbent material. The capture structure is movable between a collection configuration and a release configuration. Each strap has a primary width and a secondary width, the secondary width at least an order of magnitude smaller than the primary width. The device also includes a movable portion configured to move the capture structure between the collection configuration and the release configuration. The collection configuration includes the capture structure extending upward from the release chamber. The plurality of disks is suspended from the movable portion by the at least three straps such that, for each pair of neighboring disks of the plurality of disks having a lower disk and an upper disk and for each strap of the at least three straps the lower disk is separated from the upper disk by a connecting segment of the strap, exposing at least a portion of the capture structure to an airflow and allowing the sorbent material of the plurality of disks to capture carbon dioxide. The release configuration includes the plurality of disks being stacked entirely within the release chamber for regeneration resulting in the release of the carbon dioxide sorbed into the sorbent material, each strap of the at least three straps being collapsed, each connecting segment having assumed a release topology, the release topology sized and positioned to accommodate the stacking of the plurality of disks entirely within the release chamber. For each pair of neighboring disks of the plurality of disks and for each strap of the at least three straps, the connecting segment is biased to move toward the release topology when the lower disk is not entirely supported by the at least three straps.

Particular embodiments may comprise one or more of the following features. While in the release configuration, the plurality of disks may be stacked in the release chamber such that a gap between neighboring disks is no greater than three times the secondary width, the gap being the largest vertical distance between neighboring disks. The capture structure may include at least six straps. The plurality of disks may be releasably coupled to the at least three straps. For each disk of the plurality of disks, each strap of the at least three straps may be releasably coupled to an edge of the disk by a belt skirting the disk, pressing the strap into the edge and releasably coupling the strap to the disk. For each disk of the plurality of disks and for each strap of the at least three straps, the disk may include an aperture for the strap, the strap passing through the disk, the disk releasably coupled to the strap proximate the aperture. For each disk of the plurality of disks and for each strap of the at least three straps, the strap may be releasably coupled to the disk through a self-tightening clamp at least partially inside the aperture of the disk the strap passes through. Each self-tightening clamp may be disengaged from and made movable with respect to the strap by lifting the disk upward with respect to the strap. The self-tightening clamp may include two rotating wedges that are textured, the strap passing between them such that upward motion of the strap with respect to the self-tightening clamp causes the wedges to rotate in the direction of the motion of the strap, pinching the strap and releasably coupling the disk to the strap. For each disk in the plurality of disks and for each strap of the at least three straps, the disk may be coupled to the strap through a stopper releasably coupled to the strap beneath the disk, the stopper being too large to enter the aperture the strap is passing through. Each strap of the at least three straps may be enclosed in a different sleeve. Each sleeve may be composed of an elastic material and may be biased to shrink from an elongated state corresponding to the capture structure being in the collection configuration to a relaxed state corresponding to the capture structure being in the release configuration. For each strap of the at least three straps, the relaxed state of the sleeve may be contained within a corridor bounded by the apertures the strap passes through such that when the capture structure is in the release configuration, and the release topology may include the strap being contained within the corridor by the sleeve. For each pair of neighboring disks of the plurality of disks and for each strap of the at least three straps, the release topology of the connecting segment of the strap may include the connecting segment folding to form a fold edge that is sandwiched between the upper disk and lower disk. For each pair of neighboring disks of the plurality of disks, at least one of the upper disk and the lower disk may include a groove sized and located to at least partially receive the connecting segment when in the release topology. For each pair of neighboring disks of the plurality of disks and for each strap of the at least three straps, the release topology of the connecting segment of the strap may include the connecting segment folding to form a fold edge that is in a void between the plurality of disks and the release chamber. For each strap of the at least three straps, the strap may include a uniform strap, and each connecting segment of the strap may include the uniform strap coupled to at least one biasing strap. The biasing strap may be composed of an elastic material. For each strap of the at least three straps, each connecting segment of the strap may include two biasing straps separated by a break. The at least three straps may pass through the plurality of disks, the primary width of each strap having an orientation with respect to a radius of the disk bisecting the primary width, and wherein the orientations of the at least three straps destroy the rotational symmetry of the capture structure, hindering spinning caused by the airflow. The at least three straps may pass through the plurality of disks in a tangential fashion, the primary width of each strap having an orientation with respect to a radius of the disk bisecting the primary width. The orientation of the primary width may be closer to perpendicular to the radius than parallel with the radius. The at least three straps may pass through the plurality of disks in a radial fashion, the primary width of each strap having an orientation with respect to a radius of the disk bisecting the primary width. The orientation of the primary width may be closer to parallel with the radius than perpendicular to the radius.

According to another aspect of the disclosure, a passive carbon dioxide collection device includes a release chamber and a capture structure coupled to the release chamber and having at least six straps and a plurality of disks releasably coupled to and spaced along the at least six straps. Each disk has a sorbent material and at least three apertures passing through the disk, each strap passing through a different aperture of the at least three apertures of each disk. The capture structure is movable between a collection configuration and a release configuration, and each strap has a primary width and a secondary width, the secondary width at least an order of magnitude smaller than the primary width. The device also includes a movable portion configured to move the capture structure between the collection configuration and the release configuration. The collection configuration includes the capture structure extending upward from the release chamber, the plurality of disks suspended from the movable portion by the at least six straps such that, for each pair of neighboring disks of the plurality of disks having a lower disk and an upper disk and for each strap of the at least six straps the lower disk is separated from the upper disk by a connecting segment of the strap, exposing at least a portion of the capture structure to an airflow and allowing the sorbent material of the plurality of disks to capture carbon dioxide. The release configuration includes the plurality of disks being stacked entirely within the release chamber for regeneration resulting in the release of the carbon dioxide sorbed into the sorbent material, each strap of the at least six straps being collapsed, each connecting segment having assumed a release topology having the connecting segment folding to form a fold edge that is sandwiched between the upper disk and lower disk defining the connecting segment, the release topology sized and positioned to accommodate the stacking of the plurality of disks entirely within the release chamber. For each pair of neighboring disks of the plurality of disks and for each strap of the at least six straps, the connecting segment is biased to move toward the release topology when the lower disk is not entirely supported by the at least six straps. For each disk of the plurality of disks and each strap of the at least six straps, the disk is releasably coupled to the strap proximate the aperture the strap passes through.

Particular embodiments may comprise one or more of the following features. While in the release configuration, the plurality of disks may be stacked in the release chamber such that a gap between neighboring disks is no greater than three times the secondary width, the gap being the largest vertical distance between neighboring disks. For each disk of the plurality of disks and for each strap of the at least six straps, the strap may be releasably coupled to the disk through a self-tightening clamp at least partially inside the aperture of the disk the strap passes through. Each self-tightening clamp may be disengaged from and made movable with respect to the strap by lifting the disk upward with respect to the strap. For each disk in the plurality of disks and for each strap of the at least six straps, the disk may be coupled to the strap through a stopper releasably coupled to the strap beneath the disk, the stopper being too large to enter the aperture the strap is passing through. Each strap of the at least six straps may be enclosed in a different sleeve. Each sleeve may be composed of an elastic material and may be biased to shrink from an elongated state corresponding to the capture structure being in the collection configuration to a relaxed state corresponding to the capture structure being in the release configuration. For each strap of the at least six straps, the relaxed state of the sleeve may be contained within a corridor bounded by the apertures the strap passes through such that when the capture structure is in the release configuration, the release topology may include the strap being contained within the corridor by the sleeve. For each pair of neighboring disks of the plurality of disks and for each strap of the at least six straps, the release topology of the connecting segment of the strap may include the connecting segment folding to form a fold edge that is sandwiched between the upper disk and lower disk. For each strap of the at least six straps, the strap may include a uniform strap, and each connecting segment of the strap may include the uniform strap coupled to at least one biasing strap. The biasing strap may be composed of an elastic material. For each strap of the at least six straps, each connecting segment of the strap may include two biasing straps separated by a break. The at least six straps may pass through the plurality of disks, the primary width of each strap having an orientation with respect to a radius of the disk bisecting the primary width. The orientations of the at least six straps may destroy the rotational symmetry of the capture structure, hindering spinning caused by the airflow. The at least six straps may pass through the plurality of disks in a tangential fashion, the primary width of each strap having an orientation with respect to a radius of the disk bisecting the primary width. The orientation of the primary width may be closer to perpendicular to the radius than parallel with the radius. The at least six straps may pass through the plurality of disks in a radial fashion, the primary width of each strap having an orientation with respect to a radius of the disk bisecting the primary width. The orientation of the primary width may be closer to parallel with the radius than perpendicular to the radius.

According to yet another aspect of the disclosure, a method for suspending sorbent disks in a passive carbon dioxide collection device includes coupling at least three straps to a movable portion of the passive carbon dioxide collection device and a release chamber of the passive carbon dioxide collection device. Each strap has a primary width and a secondary width, the secondary width at least an order of magnitude smaller than the primary width. The movable portion is configured to move a capture structure having the at least three straps and a plurality of disks between a collection configuration and a release configuration, each disk of the plurality of disks having a sorbent material. The method also includes coupling the plurality of disks to the at least three straps such that the plurality of disks is suspended from the movable portion by the at least three straps when the capture structure is in the collection configuration. The plurality of disks are spaced along the at least three straps such that, for each pair of neighboring disks in the plurality of disks having a lower disk and an upper disk and for each strap of the at least three straps, the lower disk is separated from the upper disk by a connecting segment of the strap. The method includes biasing the at least three straps such that, for each pair of neighboring disks of the plurality of disks and for each strap of the at least three straps, the connecting segment is biased to move toward a release topology when the lower disk is not entirely supported by the at least three straps. The release topology is sized and positioned to accommodate the capture structure consistently moving into the release configuration. The collection configuration includes the capture structure extending upward from the release chamber, the plurality of disks suspended from the movable portion by the at least three straps, exposing at least a portion of the capture structure to an airflow and allowing the sorbent material of the plurality of disks to capture carbon dioxide. The release configuration includes the plurality of disks being stacked entirely within the release chamber for regeneration resulting in the release of the carbon dioxide sorbed into the sorbent material, each strap of the at least three straps being collapsed, each connecting segment having assumed the release topology.

Particular embodiments may comprise one or more of the following features. While in the release configuration, the plurality of disks may be stacked in the release chamber such that a gap between neighboring disks is no greater than three times the secondary width, the gap being the largest vertical distance between neighboring disks. The capture structure may include at least six straps. The plurality of disks may be releasably coupled to the at least three straps. Coupling the plurality of disks to the at least three straps may include, for each disk of the plurality of disks, releasably coupling each strap of the at least three straps to an edge of the disk with a belt skirting the disk, pressing the at least three straps into the edge. For each disk of the plurality of disks and for each strap of the at least three straps, coupling the disk to the strap may include passing the strap through the disk via a different aperture of at least three apertures, and/or releasably coupling the strap to the disk proximate the aperture. For each disk of the plurality of disks and for each strap of the at least three straps, releasably coupling the strap to the disk may include passing the strap through a self-tightening clamp at least partially inside the aperture of the disk that strap passes through. The method may further include, for each disk of the plurality of disks and each strap of the at least three straps, disengaging the self-tightening clamp, making the disk movable with respect to the strap, by lifting the disk upward with respect to the strap. The self-tightening clamp may include two rotating wedges that are textured, the strap passing between them such that upward motion of the strap with respect to the self-tightening clamp may cause the wedges to rotate in the direction of the motion of the strap, pinching the strap and releasably coupling the disk to the strap. For each disk in the plurality of disks and for each strap of the at least three straps, releasably coupling the strap to the disk proximate the aperture may include releasably coupling a stopper to the strap beneath the disk, the stopper being too large to enter the aperture the strap is passing through. The method may further include enclosing each strap of the at least three straps in a different sleeve. Each sleeve may be composed of an elastic material and may be biased to shrink from an elongated state corresponding to the capture structure being in the collection configuration to a relaxed state corresponding to the capture structure being in the release configuration. For each strap of the at least three straps, the relaxed state of the sleeve may be contained within a corridor bounded by the apertures the strap passes through such that when the capture structure is in the release configuration, the release topology may include the strap being contained within the corridor by the sleeve. For each pair of neighboring disks of the plurality of disks and for each strap of the at least three straps, the release topology of the connecting segment of the strap may include the connecting segment folding to form a fold edge that is sandwiched between the upper disk and lower disk. The method may further include forming each disk of the plurality of disks to have at least three grooves such that, for each pair of neighboring disks of the plurality of disks and for each strap of the at least three straps, at least one groove may be sized and located to at least partially receive the connecting segment when in the release topology. For each pair of neighboring disks of the plurality of disks and for each strap of the at least three straps, the release topology of the connecting segment of the strap may include the connecting segment folding to form a fold edge that is in a void between the plurality of disks and the release chamber. Each strap of the at least three straps may include a uniform strap. Biasing the at least three straps may include coupling at least one biasing strap to each connecting segment of the strap. The biasing strap may be composed of an elastic material. For each strap of the at least three straps, each connecting segment of the strap may include two biasing straps separated by a break. The method may further include passing the at least three straps pass through the plurality of disks. For each disk of the plurality of disks, the primary width of each strap may have an orientation with respect to a radius of the disk bisecting the primary width. The orientations of the at least three straps may destroy the rotational symmetry of the capture structure, hindering spinning caused by the airflow. The method may further include passing the at least three straps pass through the plurality of disks in a tangential fashion. For each disk in the plurality of disks and each strap in the at least three straps, the tangential fashion may include the primary width of the strap having an orientation with respect to a radius of the disk bisecting the primary width, the orientation of the primary width being closer to perpendicular to the radius than to parallel with the radius. The method may further include passing the at least three straps pass through the plurality of disks in a radial fashion. For each disk in the plurality of disks and each strap in the at least three straps, the radial fashion may include the primary width of the strap having an orientation with respect to a radius of the disk bisecting the primary width, the orientation of the primary width being closer to parallel with the radius than perpendicular to the radius.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the “special” definition of that term and explain how it differs from the plain and ordinary meaning. Absent such clear statements of intent to apply a “special” definition, it is the inventors’ intent and desire that the simple, plain, and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material, or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1A:
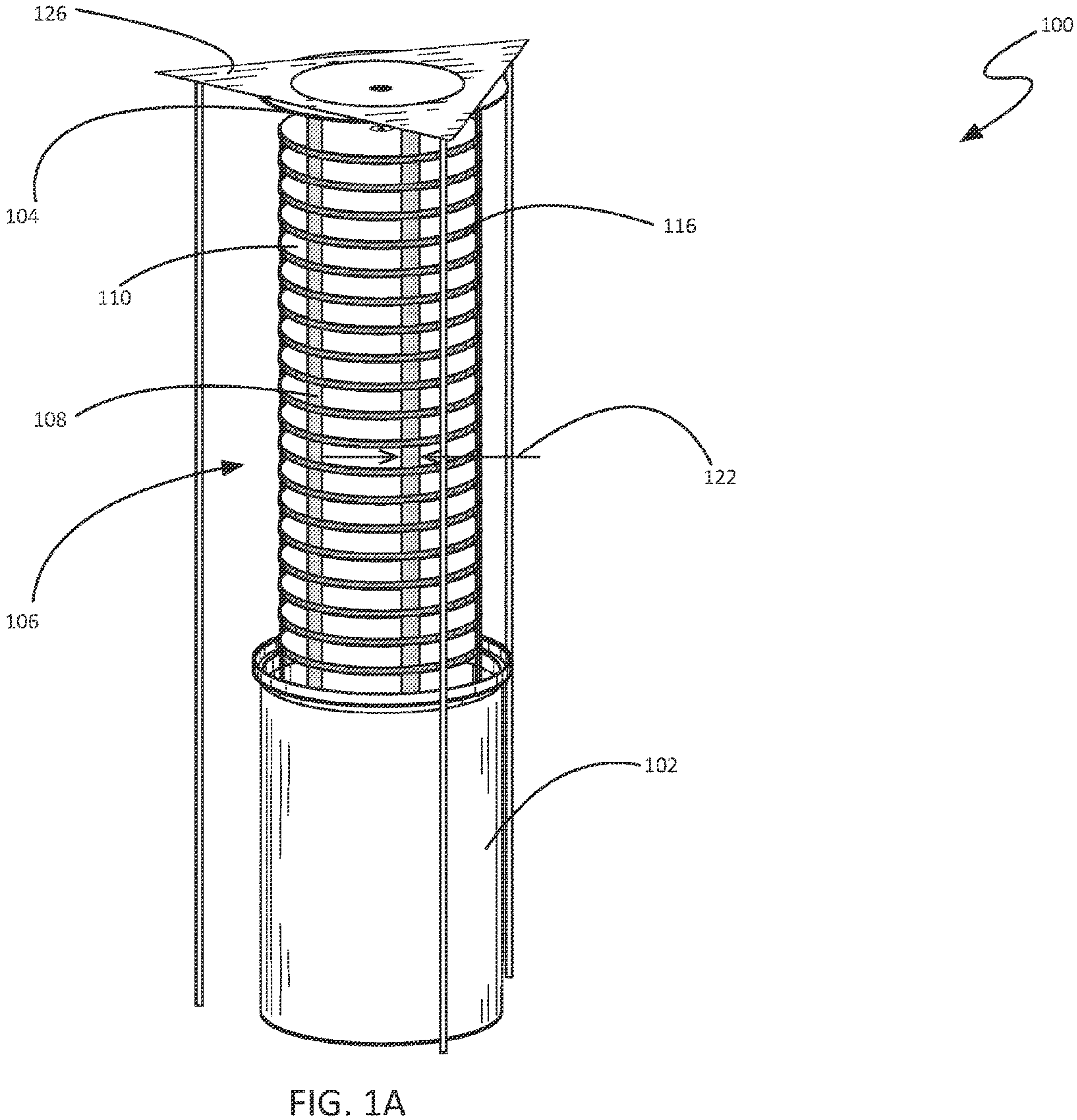
FIGS. 1A, 1B, and 1C are perspective and cross-sectional views of a passive carbon dioxide collection device with suspended sorbent disks.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

The need for technologies to remove carbon dioxide 132 from ambient air has been well established. In addition to conservation, reduced-carbon processes, and on-site capture efforts, a significant amount of carbon dioxide 132 will need to be removed from the atmosphere to avoid a looming climate change crisis. Nevertheless, the technologies are still new and the early air capture processes require large amounts of energy to operate. Since the carbon dioxide 132 in the ambient air is very dilute, atmospheric carbon dioxide 132 collectors can quickly overrun a tight energy budget for drawing in and processing air in bulk. Additionally, conventional carbon dioxide 132 collection systems often exhibit the unfortunate combination of being costly and fragile. Conventional collection device 100*s* also often have a large initial capital cost along with a high operating cost.

Figure 1B:
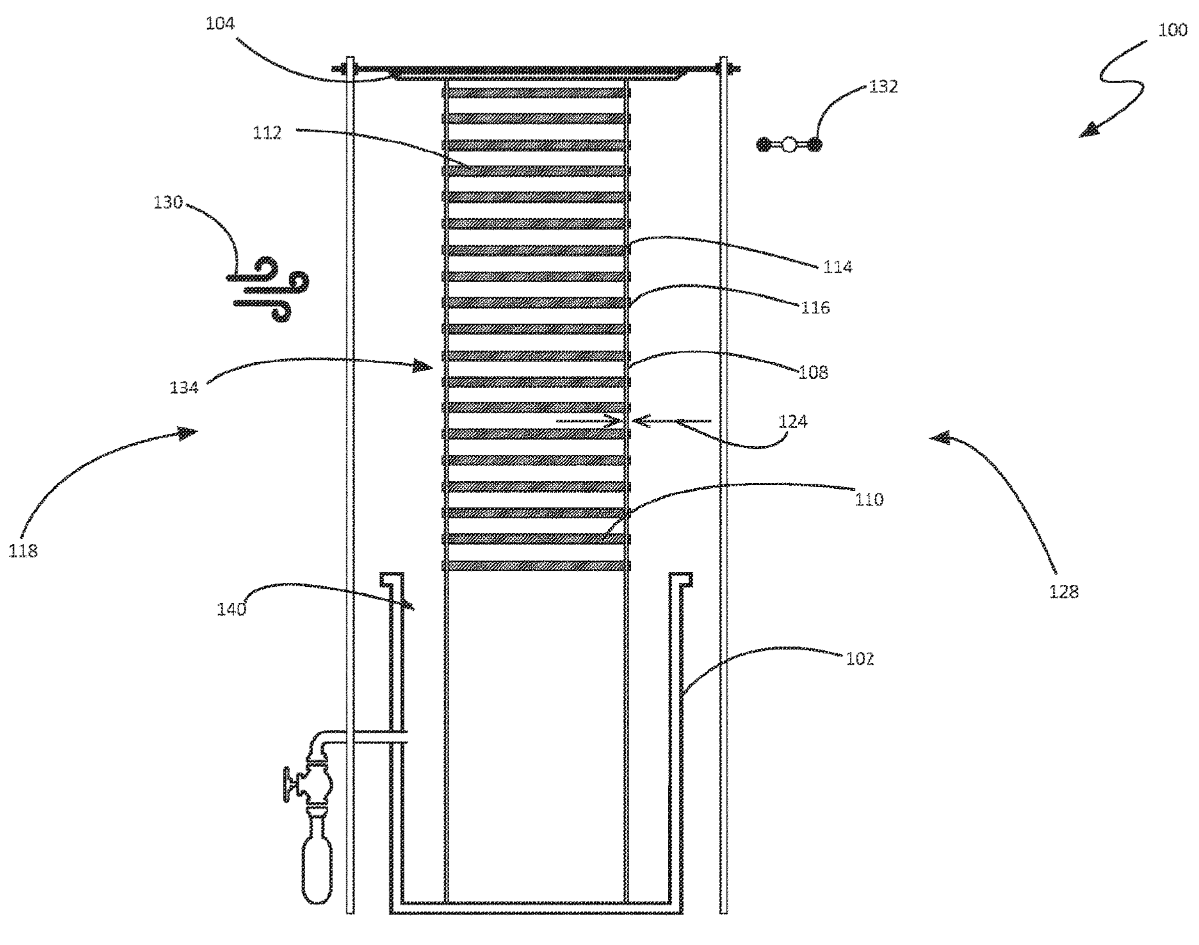
Figure 1C:
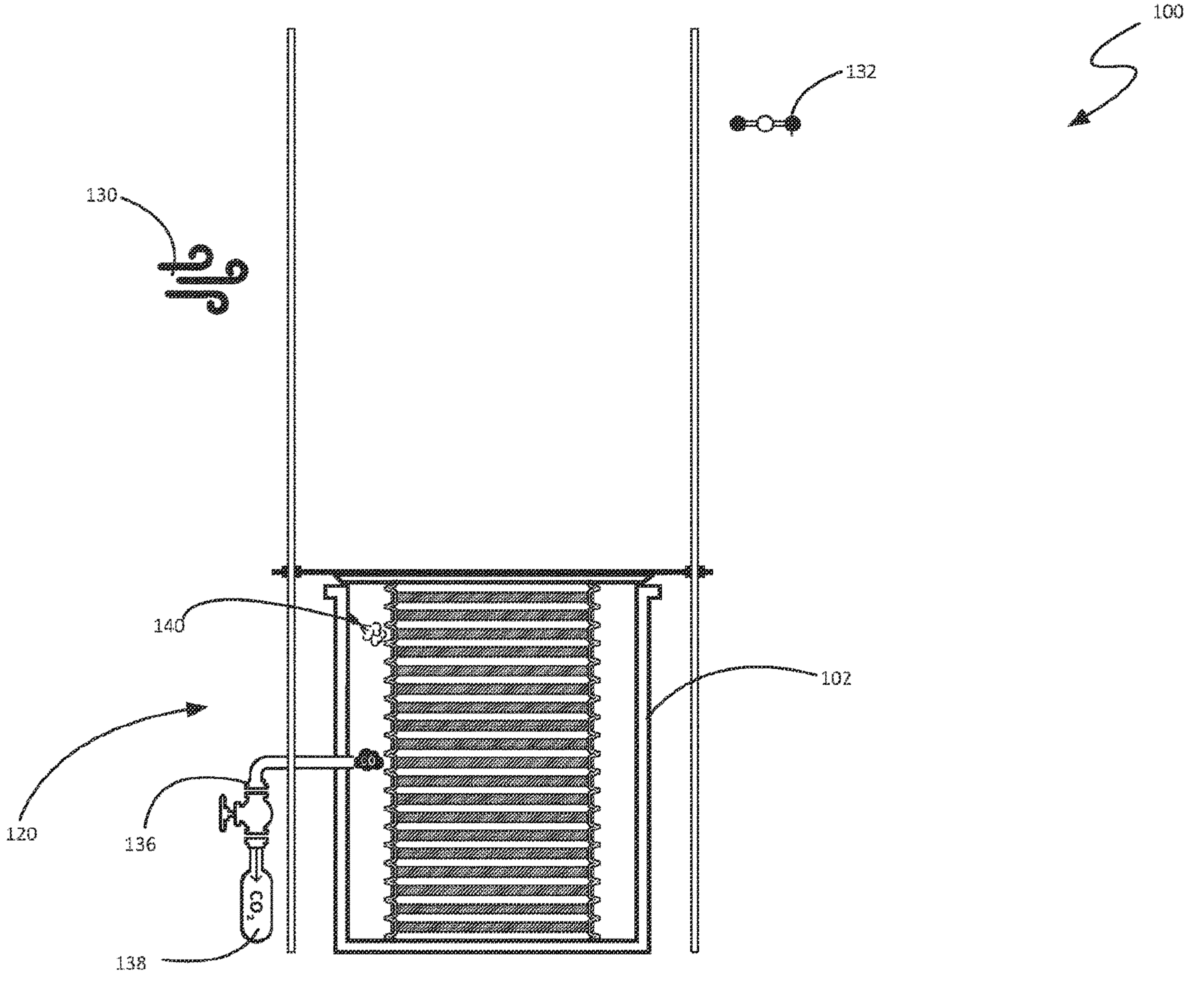

FIGS. 1A, 1B, and 1C are various views of a non-limiting example of a device 100 for passive collection of atmospheric carbon dioxide 132 (hereinafter device 100 or collection device 100), movable between two configurations. Specifically, FIG. 1A is a perspective view of a non-limiting example of the device 100. FIGS. 1B and 1C show a non-limiting example of the collection device 100 in collection 118 and release 120 configurations, respectively. This is an architecture that has many advantages over conventional collection device 100*s*. According to various embodiments, it is energy efficient, durable, and capable of being adapted for use in a variety of environments.

As shown, the device 100 comprises a capture structure 106 made up of a plurality of disks 110 comprising a sorbent material 112 capable of capturing and later releasing carbon dioxide 132. These disks 110 are suspended from a lid 104 or other movable portion 126 of the device 100 that is positioned above a release chamber 102. While in the collection configuration 118 (i.e., FIG. 1B), the capture structure 106 is extended, with the disks 110 spread out above the release chamber 102, with their sorbent material 112 exposed to the atmosphere (e.g., natural air flow, forced air flow, etc.), where they capture carbon dioxide 132. Once the disks 110 are laden with carbon dioxide 132, the capture structure 106 is moved into the release configuration 120 (i.e., FIG. 1C), where the disks 110 are stacked within the release chamber 102. The stacked disks 110 are sealed into the release chamber 102 (e.g., the lid 104 from which the disks 110 are suspended is lowered onto the release chamber 102, etc.), where they go through a regeneration cycle that releases the captured carbon dioxide 132 into the chambers, where it is harvested and stored as enriched carbon dioxide. Once the disks 110 have been regenerated and the released carbon dioxide 132 harvested, the capture structure 106 is moved back into the collection configuration 118, and the cycle repeats. The nature of the regeneration cycle depends on the type of sorbent material 112 used (e.g., heat-swing, moisture-swing, electro-swing, pressure-swing, etc.).

In the context of the present description, a disk 110 is a structure made of, or able to hold, a carbon dioxide sorbent material 112, such as a moisture-swing material, heat-swing material, and the like. It should be noted that while the following discussion and figures depict the disks 110 as circular, the methods, devices, and structures contemplated herein may be adapted for use with disks 110 of any shape.

Furthermore, it should be noted that while the following discussion and figures depict the disks 110 as being planar (i.e., a short, wide cylinder), the disks 110 may have a variety of cross-sections, including cross-sections that are not entirely flat. For example, in some embodiments, each disk may have feet on the bottom, to rest on the surface of the next disk 100 such that when stacked, there is a gap between the disks permitting fluid communication between the release chamber 102 and the sorbent material 112 of the disks 110, to facilitate regeneration of the sorbent and release of the captured sorbate gas. Some disks may be a single, integral structure, while other disks may be composed of multiple parts. Those skilled in the art will recognize that the devices and methods contemplated herein may be adapted for use with sorbent disks having any shape or profile.

The capacity for capturing carbon dioxide and the efficiency of operation depends, at least in part, on the total sorbent surface area exposed to the atmosphere while in the collection configuration 118, as well as the minimization of resources (e.g., electricity, heat, water, etc.) used during the regeneration cycle while in the release configuration 120. The advantages of this architecture over conventional collection device 100*s* are amplified as the total disk surface area increases and the total volume of the release chamber 102 decreases, according to various embodiments.

A number of methods and structures may be used to hold the disks 110 in the collection configuration 118 and move the disks 110 between the collection 118 and release 120 configurations. For example, in some embodiments, a rigid system (e.g., hydraulics, tracks, actuators, etc.) may be used. However, these systems tend to be bulky and heavy. Suspending the disks 110 from the lid 104 by a plurality of tethers and moving the lid 104 up and down is far simpler and more flexible than the rigid systems. However, even with the advantages of using flexible tethers, improving the efficiency and efficacy of the collection device 100 beyond a certain point introduces a new set of problems, which are best illustrated with a non-limiting example of a specific embodiment of a passive collection device 100.

According to one embodiment, a passive collection device 100 may employ 150 disks 110, each 1 cm thick. While each disk 110 is only a few kilograms in weight, the weight of the entire stack of disks 110 can be substantial, potentially ranging from half a ton to a few tons. Tethering each disk 110 to its neighbors would not be practical, as supporting this total weight from a single disk 110 (e.g., the disk 110 at the top of the stack) would require the use of inefficient disks 110 (e.g., heavier, more expensive, etc.), if it is possible at all. However, coupling each disk 110 to the same set of tethers running the length of the capture structure 106 would only require each disk 110 to support its own weight. This allows the collection device 100 to make use of a much larger number of disks 110, increasing the total surface area.

As mentioned above, another factor in the overall efficiency and efficacy of the device 100 is the minimization of the volume of the release chamber 102, which may be accomplished by reducing the space needed to enclose the stack of disks 110 when in the release configuration 120. This means the strength of the tethers must be balanced with their physical size and shape. Small tethers may lack sufficient strength and require greater numbers, which may inhibit air flow necessary in both the collection 118 and release 120 configurations. Large tethers may be strong enough to hold the entire stack of disks 110 but may be too large to fit within the space between disks 110 when stacked in the release configuration.

Returning to the specific, non-limiting example, the 150 disks 110, each being 1 cm thick, are spaced 4 cm apart while in the collection configuration 118, and only 0.5 cm apart when stacked in the release configuration. This results in a capture structure 106 that ranges in height from ~2 m in release configuration 120 to ~7 m in the collection configuration 118. This would mean that ~4 cm of tether must fold or otherwise collapse between neighboring disks 110 and fit into the 0.5 cm gap 208 between the disks 110 when in the release configuration 120, without undue forces on the tethers, and without the possibility that the tethers get caught between disks 110 and prevent proper stacking. Flexible tethers having a radial cross section that is roughly equal in all directions (e.g., cylindrical cable, etc.) tend to be both bulky and unpredictable in folding.

Contemplated herein is a device and method for passive carbon dioxide collection using sorbent disks 110 suspended using flexible straps 108. Advantageously, using these straps 108 to support the disks 110 facilitates the raising of the disks 110 and the lowering of the disks 110 into the chamber without interference by the strap 108 with exposure to airflow 130 or dense stacking of disks 110, according to various embodiments. A small number of straps 108 are strong enough to support the weight of the entire disk stack due to the primary width 122 and are thin enough to collapse between disks 110 when stacked.

It should be noted that while the following discussion is done in the context of suspending a series of carbon dioxide sorbent disks 110, the devices, structures, and methods contemplated herein may be adapted for use with any other instances where a series of disks 110 or plates are movable between an extended arrangement and a collapsed arrangement while making efficient use of space and reliably operating in a predictable manner.

Hereinafter, the flexible tethers contemplated herein will be referred to as straps 108. In the context of the present description and the claims that follow, a strap 108 is a flexible or semi-flexible tether having a primary width 122 and a secondary width 124, the primary width 122 being substantially larger than the secondary width 124, the widths normal to the central axis of the tether and, in some embodiments, normal to each other as well. Examples include, but are not limited to, nylon webbing, woven fabric, chains having flattened links, strips, ribbons, and the like. According to various embodiments, these straps 108 have much higher strength than ropes, and are thin in at least in one dimension (i.e., the secondary width 124). As a specific example, in one embodiment, each strap 108 may be 1.5 mm thick in the secondary direction and 2 cm wide in the primary direction. In some embodiments, the secondary width 124 is at least an order of magnitude smaller than the primary width 122.

Another advantage of the straps 108 contemplated herein, in addition to being thin, is that they naturally fold in one dimension, making their folding/collapsing much more predictable than that of rope or cable. By adjusting the primary width 122 of the strap 108, the strength may be adjusted, without sacrificing stacking height. In some embodiments, the straps 108 may be biased to fold or collapse in a specific direction in that one dimension. Biasing of straps 108 will be discussed further with respect to FIG. 5, below.

The capture structure 106 comprises the plurality of disks 110 and the straps 108. According to various embodiments, the device 100 makes use of at least three straps 108. In some embodiments, the device may suspend the disks 110 using six straps 108, allowing three straps 108 to fail or be detached for servicing without compromising the capture structure 106. One disadvantage of using straps 108, which derive their strength mainly from the primary width 122, is that they are more apt to block air flow than cylindrical cables or ropes. This may be mitigated through using different orientations, as will be discussed below with respect to FIGS. 4A-4C.

According to various embodiments, the straps 108 must hold the entire weight of the stack of disks 110, and the weight of all the disks 110 quickly adds up. Therefore, they need to be sturdy and, in aggregate, support a multi-ton weight in some embodiments. On the other hand, the linkage of a disk 110 to the strap 108 need not hold much weight. This linkage only supports its share of the weight of one disk 110. The total weight of a single disk 110 is small, on the order of 10 kg or less in some embodiments. Therefore, the coupling holding the disk 110 to the strap 108, or the structure on the strap 108 that supports the disk 110, only needs to be rated for a few kg of weight, or forces of a few tens of Newtons. This suggests that the actual connector can be lightweight, yet still effective.

The disks 110 are coupled to, and spaced along, the straps 108. This may be accomplished in a number of ways. In some embodiments, including the non-limiting example shown in FIGS. 1A-1C, the straps 108 may be coupled to the edge 114 of each disk 110. In the context of the present description and the claims that follow, an edge 114 of a disk 110 refers to the outermost surface(s) or face(s) skirting the disk 110. In some embodiments, the straps 108 may be fixedly coupled to the edge 114 of each disk 110 (e.g., attached with fasteners, adhesive, etc.). In some embodiments, the straps 108 may all be coupled to an edge 114 of a disk 110 by the same structure. In some embodiments, each strap 108 may be coupled to the disk 110 individually, while in other embodiments all straps 108 may be coupled to a disk 110 through the same structure or mechanism.

For example, in one embodiment, each strap 108 of the capture structure 106 may be coupled to an edge 114 of the disk 110 by a belt 116 skirting the disk 110, pressing the straps 108 into the edge(s) 114 such that they are prevented from moving relative to the disk 110 (e.g., friction fit, cinch compression, etc.). In the context of the present description and the claims that follow, a belt 116 may be one or more pieces of material that, together, are able to conform to the outer profile or perimeter of a disk 110 to such a degree that sufficient force may be exerted by the belt 116 on one or more straps 108 trapped between the belt 116 and the disk 110. In some embodiments, this coupling (and others) may be fixed and permanent. In other embodiments, the coupling may be releasable, which may have advantages that will be discussed in greater detail with respect to FIGS. 3 and 7, below.

As previously mentioned, the capture structure 106 of the collection device 100 can move between a collection configuration 118, shown in FIGS. 1A and 1B, and a release configuration 120, shown in FIG. 1C. In the context of the present description and the claims that follow, a collection configuration 118 is when the capture structure 106 is extended upward, either from the release chamber 102 or from some structure adjacent to the release chamber 102. The disks 110 are suspended from a movable portion 126 of the device 100 (e.g., a lid 104, etc.) by three or more straps 108. While in the collection configuration 118, at least a portion 128 of the capture structure 106 is exposed to an airflow 130, allowing the sorbent material 112 of the disks 110 to capture carbon dioxide 132.

In the context of the present description and the claims that follow, a release configuration 120 is when the plurality of disks 110 are stacked on top of each other, and the entire stack of disks 110 is entirely within the release chamber 102 for exposure to a sorbent regeneration system 140, resulting in the release of the carbon dioxide 132 sorbed into the sorbent material 112. Examples of a sorbent regeneration system 140 include, but are not limited to, a water source, a steam source, a heater, a vacuum pump, an electric power source, and the like. According to various embodiments, the released carbon dioxide 132 is removed from the release chamber 102 via a product outlet 136 as a product stream 138 of concentrated carbon dioxide 132, for storage, purification, pressurization, sequestration, use as feedstock for another process, and the like.

The devices and methods contemplated herein are directed to attaching disks along the straps and manipulating the segment of strap between disks in a neighboring pair 134 (i.e., the segment of strap that needs somewhere to go when the disks are stacked). Specifically, the devices and methods contemplated herein manipulate the portion of strap 108 between neighboring disks such that it does not interfere with the transition between collection and release configurations, and such that the volume of the release chamber 102 may be minimized. Therefore, it is instructive to examine a neighboring pair 134 of disks 110 in various embodiments.

Figure 2A:
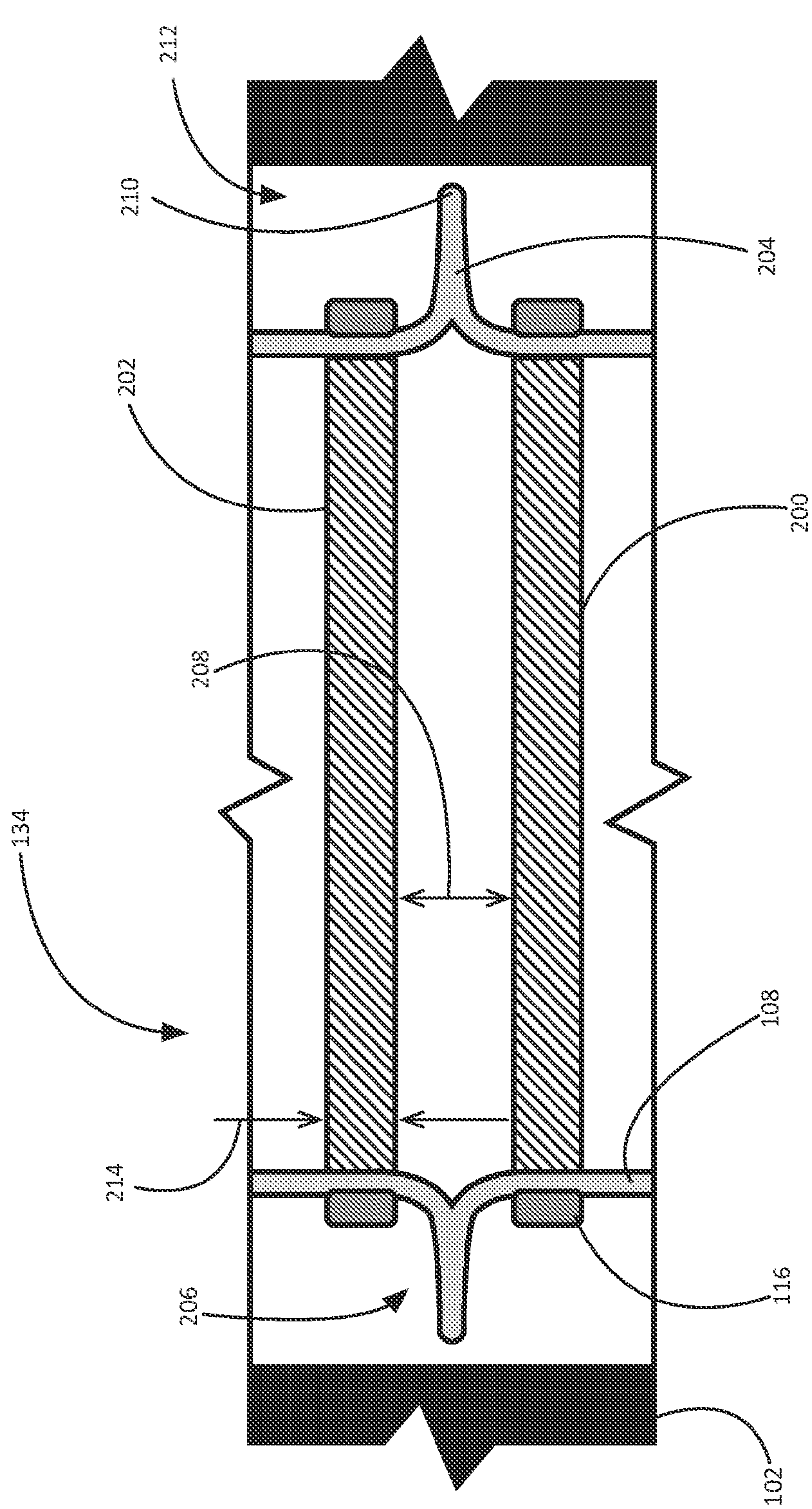
FIGS. 2A and 2B are top and cross-sectional views of a neighboring pair of disks from the device in FIGS. 1A-C, in the release configuration.
Figure 2B:
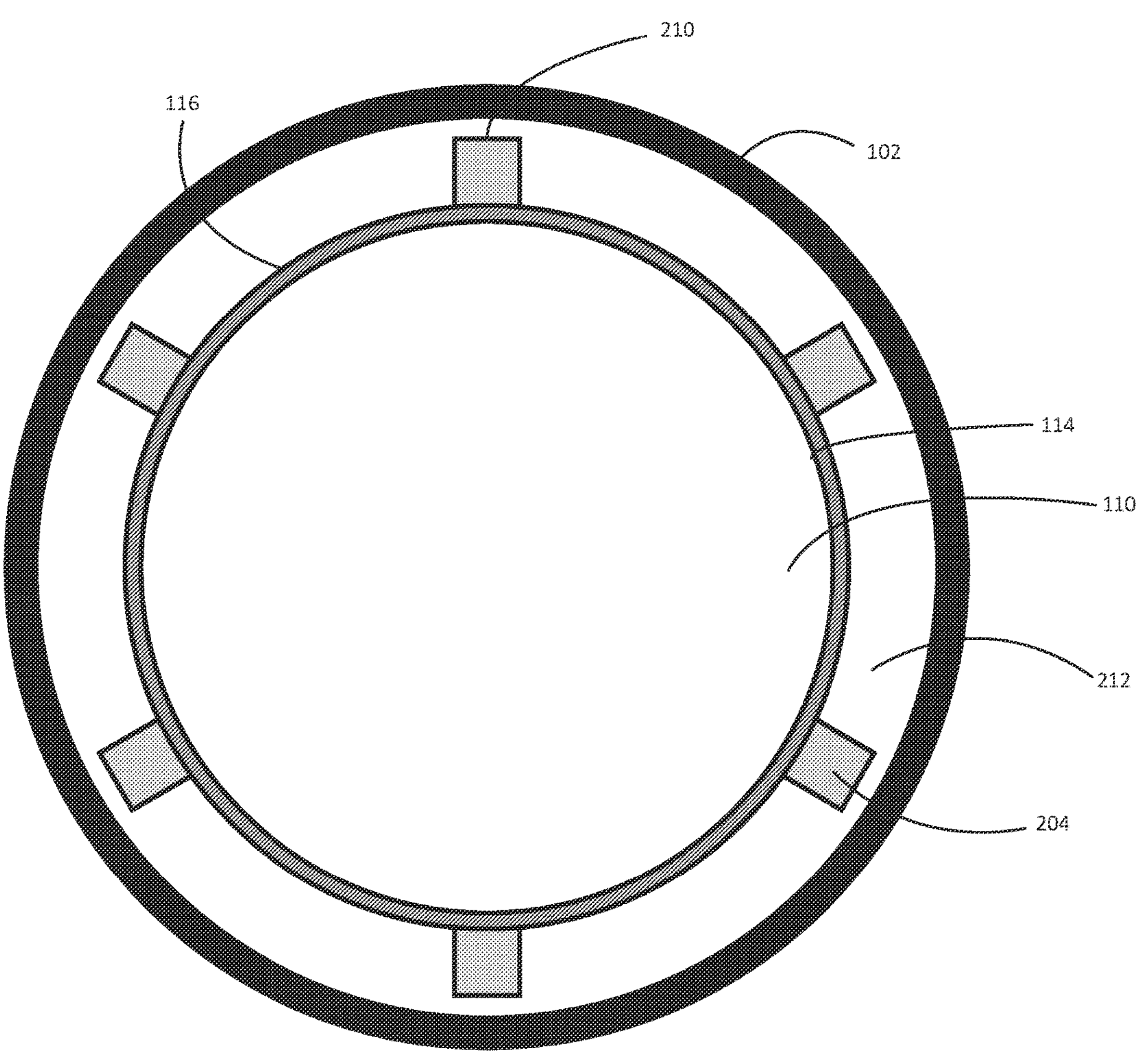

FIGS. 2A and 2B are top and cross-sectional views of a non-limiting example of a neighboring pair 134 of disks 110 from the device 100 in FIGS. 1A-1C while in the release configuration 120. While the following discussion will be in the context of a single pair 134, it should be noted that it is not a specific pair 134 among the disks 110, and that the following could be applied to any neighboring pair 134 among the plurality of disks 110, according to various embodiments.

As shown, each neighboring pair 134 comprises a lower disk 200 and an upper disk 202. Both of these disks are coupled to the straps 108, only two of which are visible in the cross-section side view of FIG. 2A. For each strap 108, the portion of the strap 108 that is between the lower disk 200 and the upper disk 202 is called the connecting segment 204. Put differently, the connecting segment 204 of a strap 108 is the portion of the strap 108 separating the upper disk 202 from the lower disk 200 when the capture structure is in the collection configuration 118 and the disks 110 are fully suspended by the straps 108. The connecting segment 204 is defined by the upper disk 202 and lower disk 200, for each pair 134.

Within a neighboring pair 134, the connecting segment 204 of a strap 108 has the potential to cause problems with the operation of the collection device 100 if conventional methods are used. If the strap 108 is too thick, the connecting segment 204 might take up too much room when collapsed during the stacking of the disks 110 as the capture structure 106 is moved into the release configuration 118. At the least, this could reduce the efficiency of the device, requiring a larger release chamber 102, and thus more resources to apply the sorbent regeneration system 140 (e.g., more steam to fill the release chamber, etc.). At worst, the connecting segment 204 may cause a malfunction, preventing the capture structure 106 from fitting inside the release chamber 102. Using conventional methods, the connecting segment 204 will collapse in an unpredictable way, and adapting the device (e.g., release chamber size and shape, etc.) to deal with this unpredictability will introduce inefficiencies in a technology already operating on a tight energy and resource budget, according to various embodiments.

Contemplated herein is a device 100 and method that causes the connecting segment 204 to behave in a predictable and advantageous way. According to various embodiments, the strap 108, or more specifically the connecting segment 204, is biased to move toward a release topology 206 when the lower disk 200 is not entirely supported by the straps 108 (i.e., the lower disk 200 is resting on something or being held up by something other than the connecting segment 204 above it). In the context of the present description and the claims that follow, a release topology 206 is an arrangement of the connecting segment 204 that is sized and positioned to accommodate the stacking of the plurality of disks 110 entirely within the release chamber 102. In some embodiments, this accommodating the stacking of the disks 110 does so in an efficient manner (e.g., minimize size without sacrificing fluid communication with the sorbent material, etc.).

A release topology 206 may be defined in several different ways. In some embodiments, a release topology 206 may be general, simply specifying that the connecting segment 204 bend in a particular direction. In other embodiments, a release topology 206 may be more specific, defining a specific shape that the connecting segment 204 assumes as the capture structure 106 moves towards the release configuration 120. In still other embodiments, a release topology 206 may be defined as a volume that the connecting segment 206 will be constrained to fit inside, but may take on different shapes within that volume. These variations may be caused by changes in the state of the capture structure 106 while moving between configurations. As a specific example, if the capture structure 106 began to twist slightly due to the airflow 130 as it is being lowered into the release chamber 102, the connecting segment 204 of a strap 108 may end up in a slightly different location, but may be biased such that even with such variances it will end up in a predictable volume, allowing the device 100 to be designed for consistent and efficient operation, even in environments where such variances are common and varied. The biasing of the strap 108 will be discussed in greater detail below, in the context of FIG. 5.

In some embodiments, the release topology 206 may be that the connecting segment 204 is folded to form a fold edge 210 (i.e., the "hinge" of the fold). In embodiments where the release topology 206 comprises a single fold (i.e., a single fold edge 210), the connecting segment 204 will not take up much room, particularly because the second width 124 of a strap 108 can be very small. In some embodiments, the release topology 206 may further define where that fold edge 210 is positioned, with respect to the disk 110. For example, in the non-limiting example shown in FIGS. 2A and 2B, the fold edge 210 is in the void 212 or empty space between the stack of disks 110 and the wall of the release chamber 102. This release topology 206, like many others, has advantages and disadvantages. Advantageously, it positions most, if not all, of the connecting segment 204 outside the space between the upper disk 202 and the lower disk 200, facilitating the fluidic contact between the sorbent material 112 of those disks 110 and the interior of the release chamber 102 during regeneration. However, as shown, folding into the void 212 may require the use of a larger release chamber 102, increasing the volume of some regeneration resources needed (e.g., water, steam, heat, pumping, etc.) and therefore reducing overall efficiency, as discussed above. Other positions for the fold edge 210 will be discussed below, in the context of FIGS. 3A and 3B as well as FIGS. 4A and 4B.

The separation between the upper disk 202 and lower disk 200 shown in the non-limiting example of FIG. 2A is exaggerated for visual clarity. In some embodiments, the gap 208 between the upper disk 202 and lower disk 200 may be small in comparison with other dimensions of the capture structure 106. In the context of the present description and the claims that follow, the gap 208 is the largest vertical distance between the lower disk 200 and upper disk 202 of a neighboring pair 134, while the capture structure 106 is in the release configuration 120. In some embodiments, the gap 208 between neighboring disks 110 may be no greater than three times the secondary width 124. In other embodiments, that gap 208 may be just slightly larger than twice the secondary width 124. In still other embodiments, the gap 208 between neighboring disks 110 may be approximately half of the thickness 214 of a disk 110. In other embodiments, the gap 208 between neighboring disks 110 may be on the order of the thickness 214 of a disk 110.

Figure 3A:
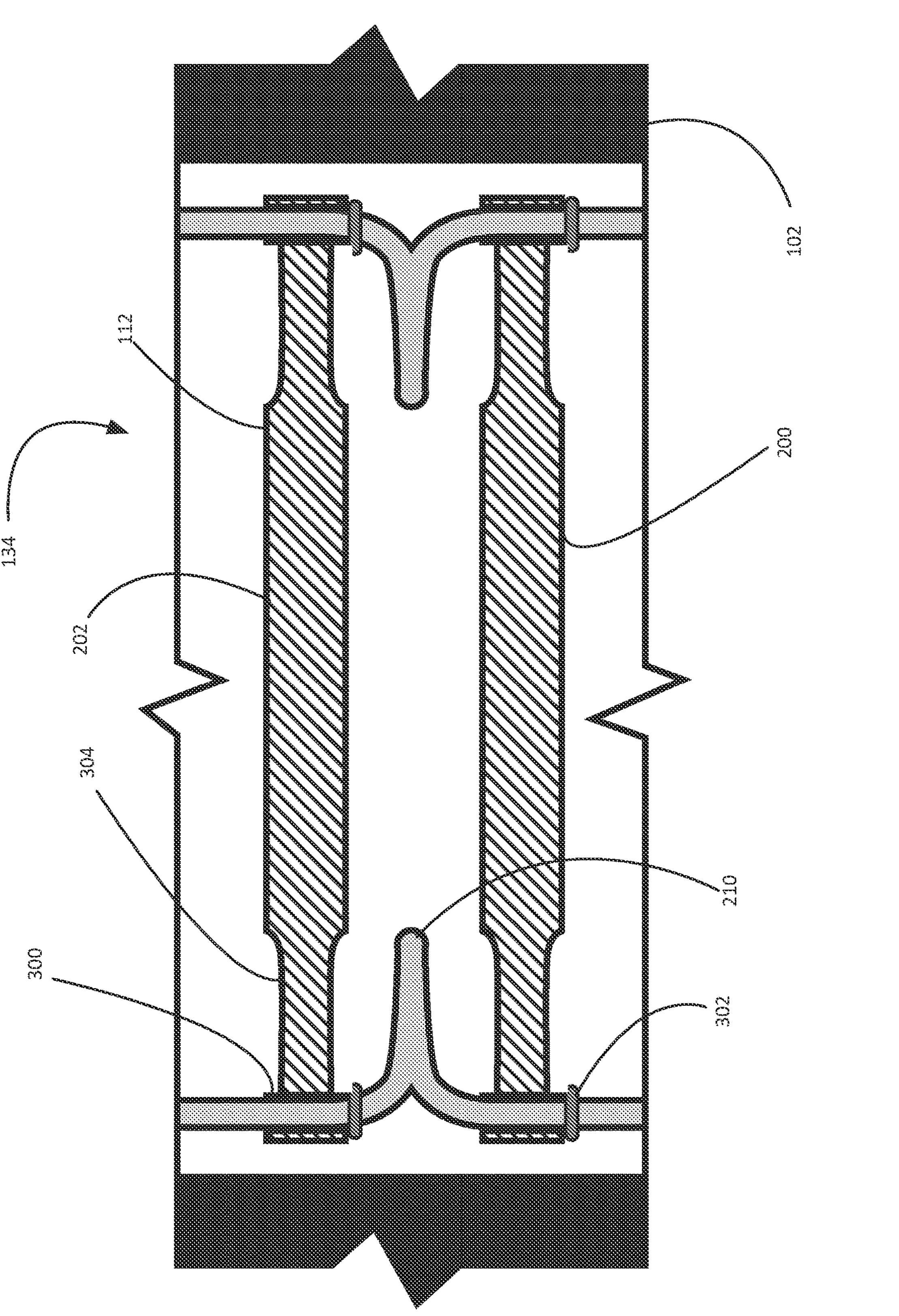
FIGS. 3A and 3B are top and cross-sectional views of a neighboring pair of disks from another embodiment of a passive carbon dioxide collection device, in the release configuration.
Figure 3B:
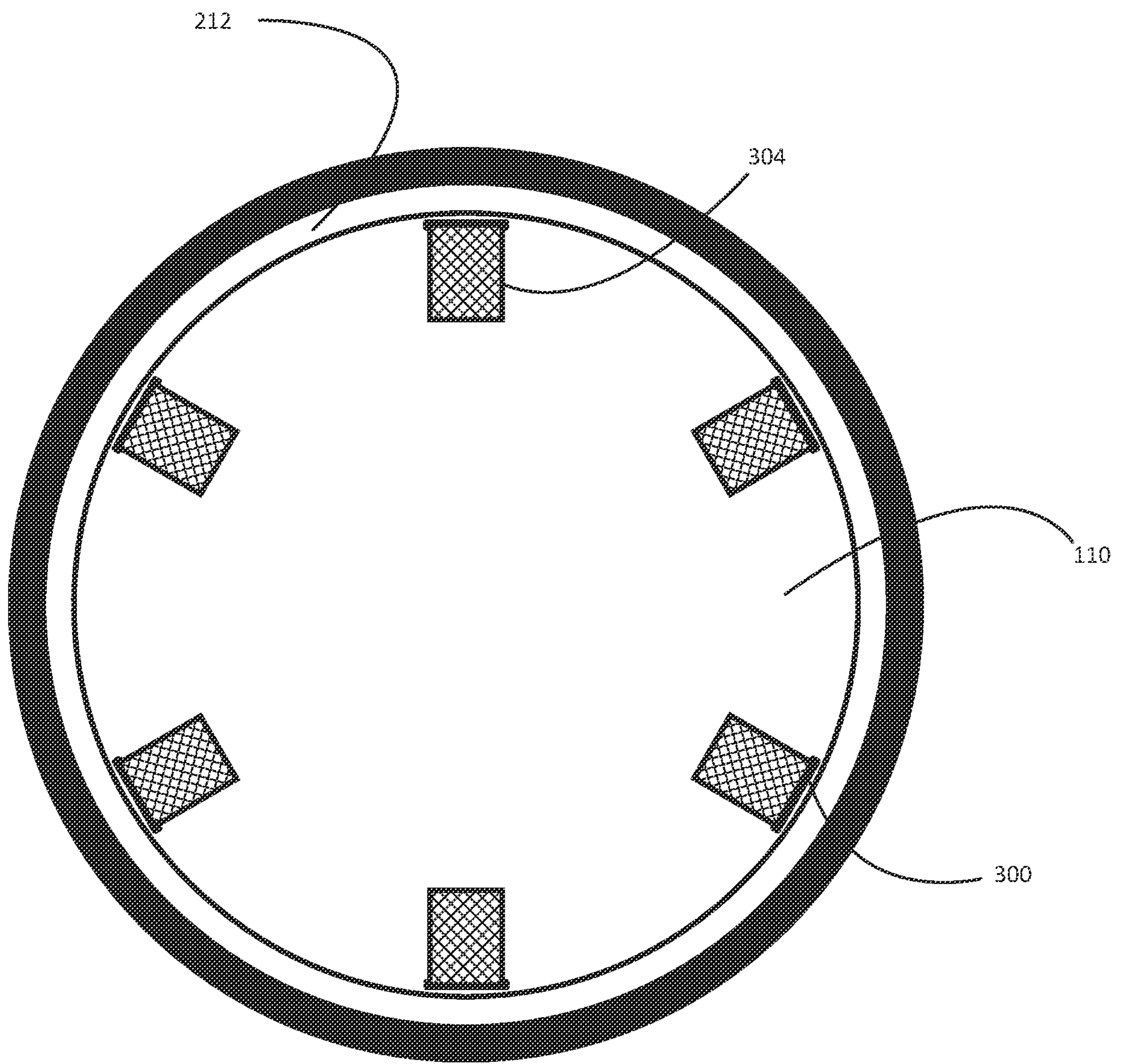

FIGS. 3A and 3B are cross-sectional side and top views, respectively, of a non-limiting example of a neighboring pair 134 of disks 110 from another embodiment of a passive carbon dioxide collection device 100, in the release configuration 120. In some embodiments, such as the non-limiting example shown in the previous figures, the straps 108 may be coupled to the disks along their outermost edge 114. In other embodiments, the straps 108 may pass through the disks 110. Coupling the straps 108 to the disks 110 by passing the straps 108 through the disks 110 via apertures 300 may be advantageous, as it may provide a strong coupling that does not add as much weight or bulk to the disks as an external coupling, such as what is shown in the previous figures. The external coupling, in most cases, requires the addition of material (e.g., the belt 116, adhesive, fasteners, etc.) to the disk 110, while coupling in conjunction with an aperture 300 instead involves removing mass from the disk 110 to form the aperture 300.

According to various embodiments, including the non-limiting example shown in FIGS. 3A and 3B, each disk 110 may comprise a plurality of apertures 300 passing through the disk 110, one for each strap 108. According to various embodiments, apertures 300 may have various shapes including, but not limited to, circular, rectangular, trapezoidal, and the like.

Each strap 108 is passed through the disk 110 via a different aperture 300 and then coupled, releasably or otherwise, to the disk 110 proximate that aperture 300. In the context of the present description and the claims that follow, proximate the aperture 300 means, when speaking of coupling to a strap 108, the coupling between the disk 110 and strap 108 occurs either inside the aperture 300, or the coupling is made through something in direct contact with the surface of the disk surrounding the aperture 300.

For example, the non-limiting example of a neighboring pair 134 shown in FIGS. 3A and 3B is releasably coupled to the six straps 108 proximate the six apertures 300 of each disk 110. As shown in FIG. 3A, according to some embodiments the disk 110 is coupled to the strap 108 through a stopper 302 that is releasably coupled to the strap 108 beneath the disk 110. The stopper 302 is sized and/or shaped to be too large to pass through the aperture 300 that the strap 108 is passing through, allowing the strap 108 to be used to lift the disk 110 out of the release configuration 120.

In some embodiments, the disks 110 may be fixedly coupled to the straps 108. In other embodiments, the disks 110 may be releasably coupled to the straps 108, making it possible to adjust where the disks 110 are attached along the straps 108. This may be advantageous, because in some embodiments the straps 108 may be composed of materials that will change over time due to exposure. As a specific example, a device 100 that receives more exposure to sunlight on one side than on the other side may, over time, may experience a lengthening of the straps 108 that receive more solar heating. Disks 110 that began substantially parallel to each other and the ground would eventually start tilting. This may increase the forces exerted on the capture structure 106 by gusts of wind, and could lead to additional problems, beyond a reduction in effectiveness. The ability to release the disk 110 from one or more straps 108 and then reattach it would allow such a situation to be remedied before failure.

Another example of a releasable coupling is the use of a bridge-like structure spanning between apertures 300, holding the disk 110 on the "rungs" of multiple ladders made of paired straps 108. Still another example of a releasable coupling may resemble a belt buckle that latches on to the straps 108, or holes in the straps 108. Those skilled in the art will recognize that many other methods for releasably coupling a disk 110 to a plurality of straps 108 exist, and other methods known in the art may be adapted for use with a disk-based collection device 100.

As previously mentioned, many release topologies 206 have both advantages and disadvantages. The release topology 206 shown in the previous figures, where the fold edge 210 is in the void 212 between the disks 110 and the inner wall of the release chamber 102, has the disadvantage of requiring a larger release chamber 102 than would otherwise be necessary. According to various embodiments, a release topology 206 that solves this problem (but introduces a new problem that happens to be solved by the topology 206 of the previous figures) is one where each connecting segment 204 has a single fold, with the fold edge 210 sandwiched between the upper disk 202 and lower disk 200. By having the connecting segment 204 fold inward, the void 212 may be reduced in size, which may increase the efficiency of the device 100.

However, according to various embodiments, release topologies 206 where the fold edge 210 is sandwiched between the upper disk 202 and the lower disk 200, or any other arrangement where the straps 108 are mostly trapped between disks 110 when in the release configuration 120, may require that the surfaces of the disks 110 to be carved out to form a groove 304 sized and located to receive (or at least partially receive) the connecting segment 204, thus reducing the height of the stacked disks 110. While this may result in very small gaps 208, the downside is that the grooves 304 may reduce the surface area of sorbent material 112 on the disks 110. In some embodiments, the grooves 304 may be on a single side of each disk 110, while in other embodiments, both sides of the disks 110 may have grooves 304 that align to create a pocket for the connecting segment 204 when the capture structure 106 is in the release configuration 120. As a specific example, in one embodiment, a groove 304 may be 0.3 cm deep.

As mentioned above, in some embodiments, the straps 108 may be biased to always fold in a particular direction. For example, the straps 108 in FIGS. 2A and 2B could be biased to always fold outward. In other embodiments, the straps 108 may fold in either direction. In other words, in some embodiments, the release topology 206 may be large enough to encompass the connecting segment 204 folding in either direction. For example, in one embodiment, the device 100 may have the larger release chamber 102 needed for the outward fold of FIGS. 2A and 2B, in addition the grooves 304 needed for an inward fold of FIGS. 3A and 3B, thus allowing the straps 108 to fold either way without disrupting the operation of the device 100.

Figure 4A:
FIGS. 4A, 4B, and 4C are top views of pairs of disks from different embodiments, each with straps having different orientations.
Figure 4A:
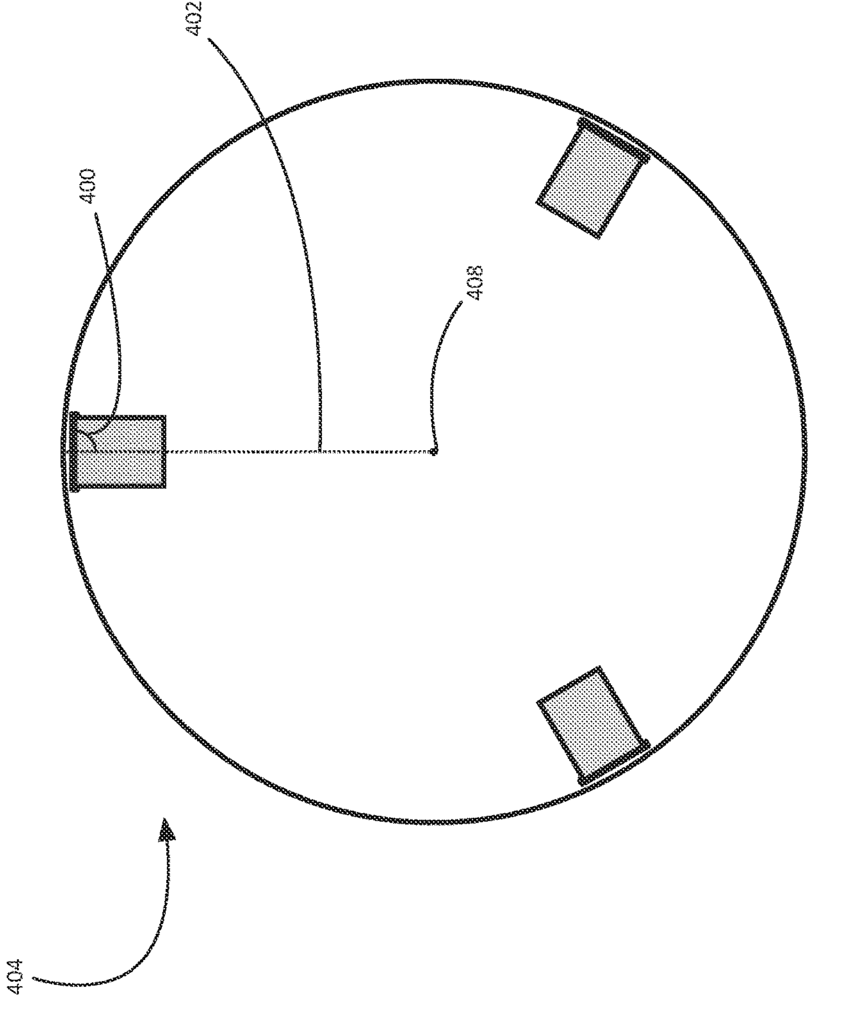
Figure 4B:
Figure 4B:
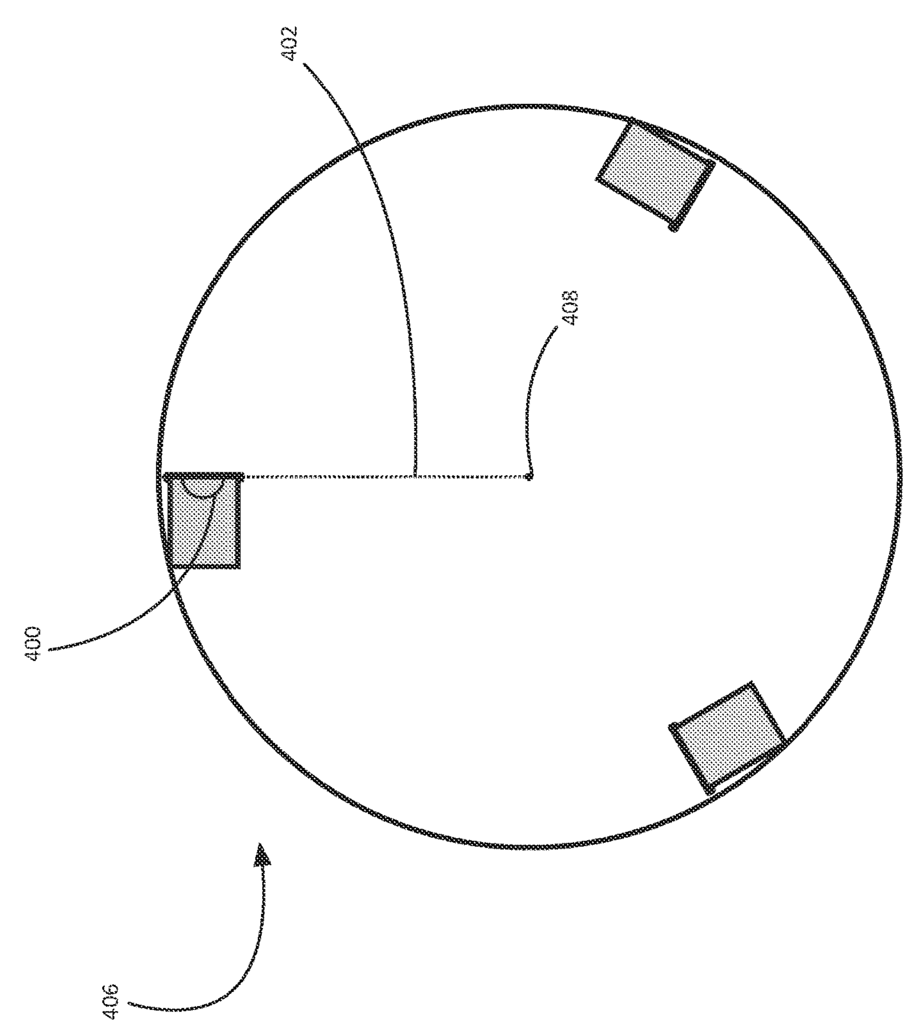
Figure 4C:
Figure 4C:
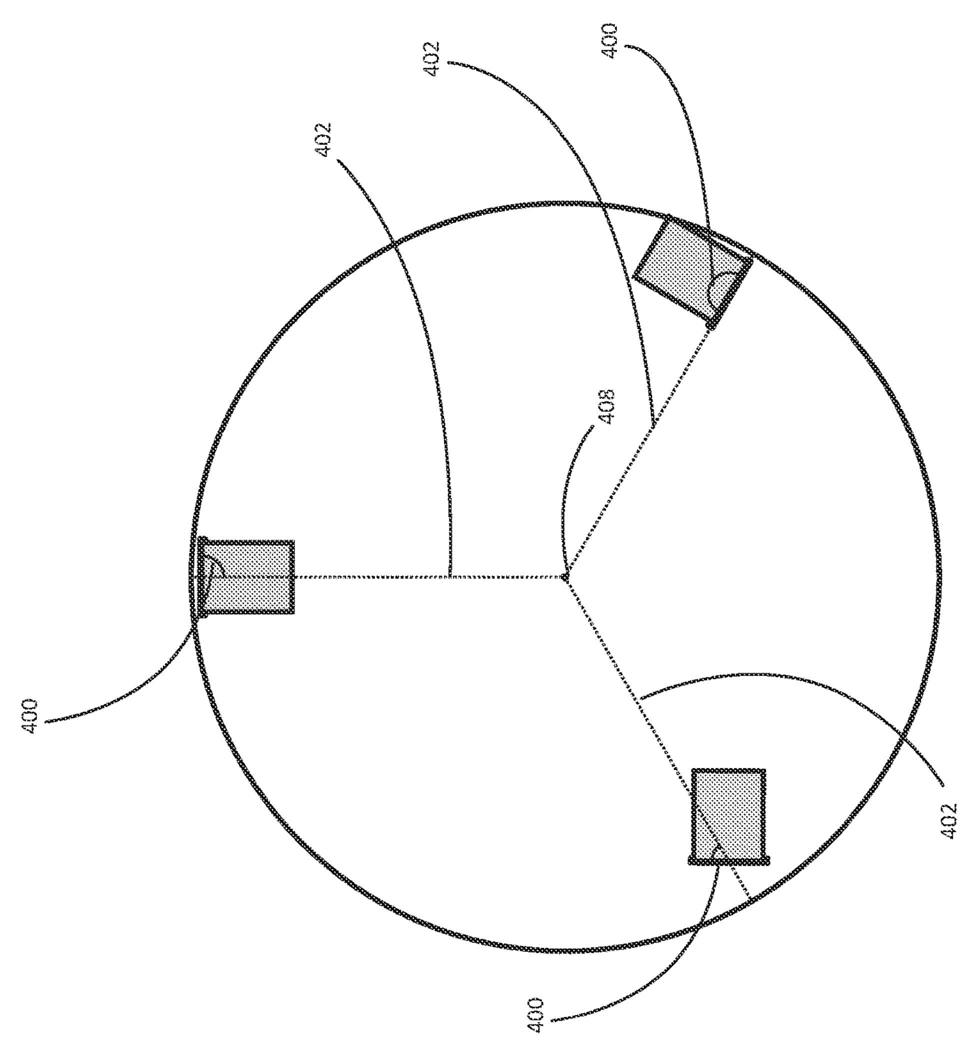

FIGS. 4A, 4B, and 4C are top views of a non-limiting example of the lower disk 200 of neighboring pairs 134 of disks from different embodiments, each with straps 108 having different orientations 400. In the context of the present description and the claims that follow, an orientation 400 of a strap 108 refers to its angle with respect to the disk 110 at the point where the disk 110 and the strap 108 intersect (i.e., an aperture 300, an edge 114, etc.). More precisely, an orientation 400 of a strap 108 is the angle formed between the primary width 122 of the strap 108 and a radius 402 of the disk 110 that bisects the primary width 122. In the context of the present description and the claims that follow, a radius 402 of a disk 110 is a vector extending outward from the centroid 408 or geometric center of the disk 110.

According to various embodiments, the straps 108 may be coupled to the disk 110 in a variety of orientations 400. In some embodiments, including the non-limiting example shown in FIG. 4A, straps 108 may pass through, or be coupled to, the disk 110 in a tangential fashion 404. In the context of the present description and the claims that follow, a tangential fashion 404 is where the orientation 400 of the primary width 122 is closer to perpendicular to the radius 402 bisecting the primary width 112 than parallel with the radius 402. In some embodiments, tangential fashion 404 may refer to the primary width 122 having an orientation 400 that is within 10 degrees of perpendicular to said radius 402. In other embodiments, tangential fashion 404 may refer to the primary width 122 having an orientation 400 that is within 15 degrees of perpendicular to said radius 402.

Having straps 108 pass through the disk 110 in a tangential fashion 404 may be advantageous, as it may inhibit the capture structure 106 from twisting or spinning in the airflow 130. However, the tangential fashion 404 may also block some of that airflow 130 from entering the space between the disks 110, as the straps 108 may act as a series of narrow walls around the perimeter of the disks 110.

In some embodiments, including the non-limiting example shown in FIG. 4B, straps 108 may pass through, or be coupled to, the disk 110 in a radial fashion 406. In the context of the present description and the claims that follow, a radial fashion 406 is where the orientation 400 of the primary width 122 is closer to parallel with the radius 402 bisecting the primary width 112 than perpendicular to said radius 402. In some embodiments, radial fashion 404 may refer to the primary width 122 having an orientation 400 that is within 10 degrees of parallel with said radius 402. In other embodiments, radial fashion 404 may refer to the primary width 122 having an orientation 400 that is within 15 degrees of parallel with said radius 402.

Having straps 108 pass through the disk 110 in a radial fashion 406 may be advantageous, as it may not block the airflow 130 as much as the tangential fashion 404 would. However, the radial fashion 406 may result in the airflow 130 causing the capture structure 106 to spin, with the connecting segments 204 serving as small rotor blades. In some circumstances said spinning may be beneficial. This motion may help the capture structure 106 to shed moisture quickly after a regeneration cycle within the release chamber 102, speeding up the cycle of a moisture-swing based collection device 100. However, unless the spinning or twisting forces are anticipated and accounted for, such strain may cause wear on the straps 108 or their coupling to the movable portion 126, eventually resulting in a breakdown of the device 100.

In some embodiments, all of the straps 108 may have the same orientation 400. In other embodiments, the straps 108 may have two, three, or more different orientations 400. In some cases, it may be advantageous to have different strap orientations 400 within the same capture structure 106. In some embodiments, including the non-limiting example shown in FIG. 4C, differing orientations 400 may be used to destroy the rotational symmetry of the capture structure 106, with respect to a central vertical axis of the capture structure 106 passing through the centroids 408 of the disks 110, thus hindering spinning caused by the airflow 130. In some embodiments, the straps 108 may use divergent orientations 400 (e.g., some tangential, some radial, etc.) to achieve a balance of the advantages and disadvantages discussed herein. Ultimately, the best orientation 400 will depend on a number of considerations including, but not limited to, the type of sorbent material 112 used, the energy cost of regeneration per unit volume of the release chamber 102, and the like.

Figure 5:
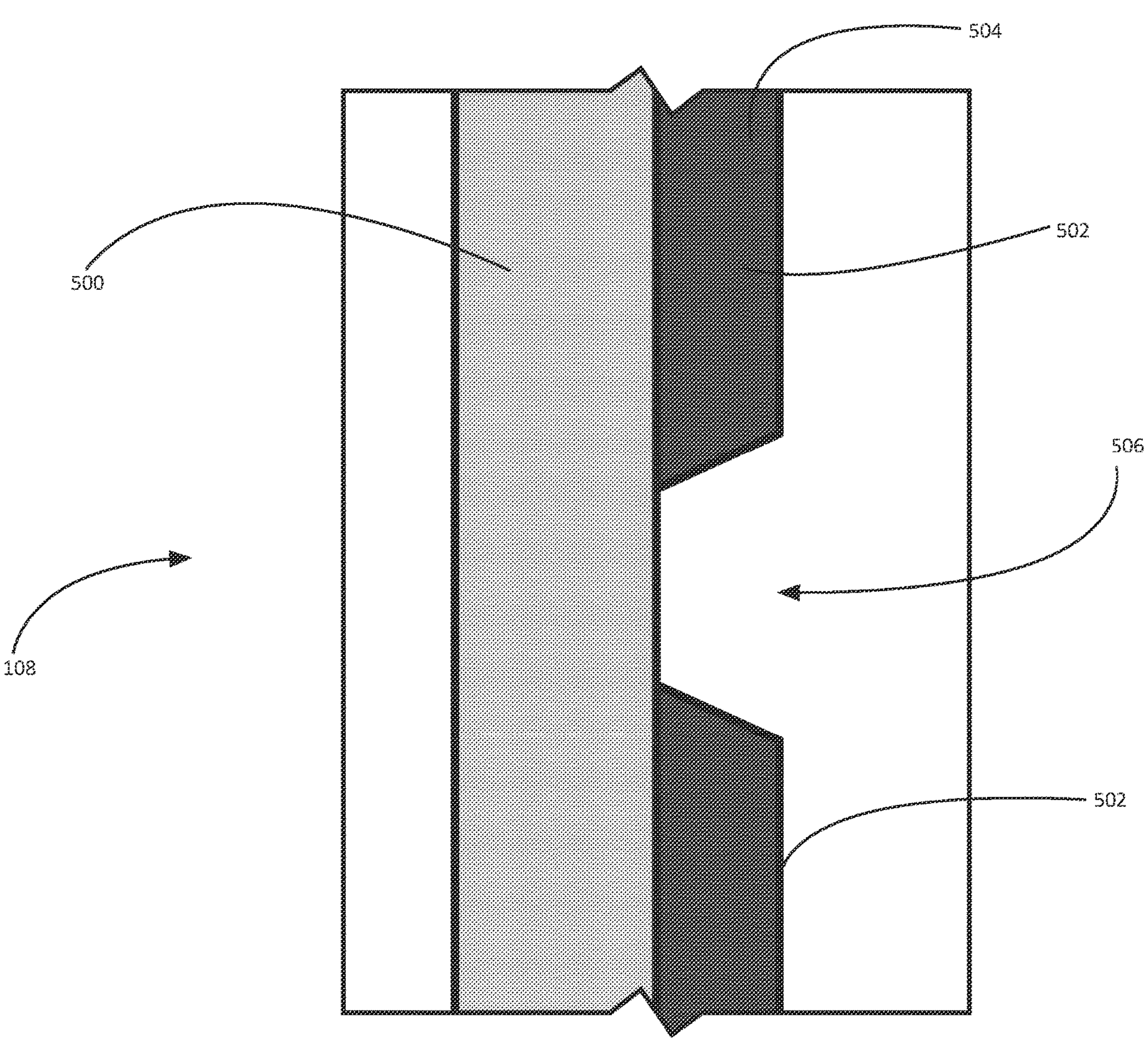
FIG. 5 is a cross-sectional side view of segment of a strap.

FIG. 5 is a cross-sectional side view of a non-limiting example of part of a connecting segment 204 of a strap 108. As previously mentioned, the straps 108 (or at least the connecting segments 204 of the straps 108) are biased to move towards a release topology 206. In some embodiments, the biasing may be accomplished through the construction of the strap 108 (e.g., the weave of a webbing strap being thicker on one side, etc.). In other embodiments, materials may be added to a uniform strap 500 to break the symmetry and/or encourage folding in a desired direction and/or at a desired point to enter the desired release topology 206. For example, in some embodiments including the non-limiting example shown in FIG. 5, the strap 108 comprises a uniform strap 500, with each connecting segment 204 of the strap 108 comprising at least one biasing strap 502 that is coupled to the uniform strap 500.

In some embodiments, the strap 108 may comprise a uniform strap 500 coupled to a single biasing strap 502 throughout. As an option, in some embodiments that biasing strap 502 may be composed of an elastic material 504 under a slight strain, such that the side of the strap 108 having the biasing strap 502 is wanting to contract, biasing the strap 108, or otherwise unconstrained portions of the strap 108 (i.e., connecting segments 204) to bend towards the biasing strap 502 to reduce that strain. The elastic material 504 may be an elastomer or other material having elastic properties and compatible with being coupled to the uniform strap 500.

In other embodiments, including the non-limiting example shown in FIG. 5, the strap 108 may comprise a uniform strap 500, and each connecting segment 204 comprises two biasing straps 502 coupled to the uniform strap 500, the two biasing straps 502 separated by a break 506 (for each connecting segment 204). Like the embodiment with a single biasing strap 502 running the length of the uniform strap 500, the biasing straps 502 separated by the break 506 may also be composed of elastic material 504 that is under a slight strain, also causing the connecting segments 204 to bend towards the biasing straps 502. However, the fold edge 114 of the resulting release topology 206 is predictably going to be where the break 506 is, as there is no biasing strap 502 getting in the way. Still other embodiments may employ coatings, sleeves, indentations, and the like, to bias the strap 108 to fold or otherwise collapse into a desired release topology 206.

It should be noted that in embodiments employing apertures 300 (e.g., embodiments of FIGS. 3A and 3B, etc.), as well as embodiments coupling the straps 108 along an outer edge 114 through friction (e.g., embodiments of FIGS. 2A and 2B, etc.), the shape of the strap 108 may be defined, or at least influenced, by the shape of a surface of the disk 110 to which it is coupled (e.g., the shape of the aperture 300, the shape of the edge 114, etc.). Modifying the shape of the strap 108 beyond a flat plane may serve to encourage folding in a particular direction, or inhibit folding in another direction, like the curvature of a metal measuring tape that allows it to resist buckling under its own weight when extended.

Figure 6A:
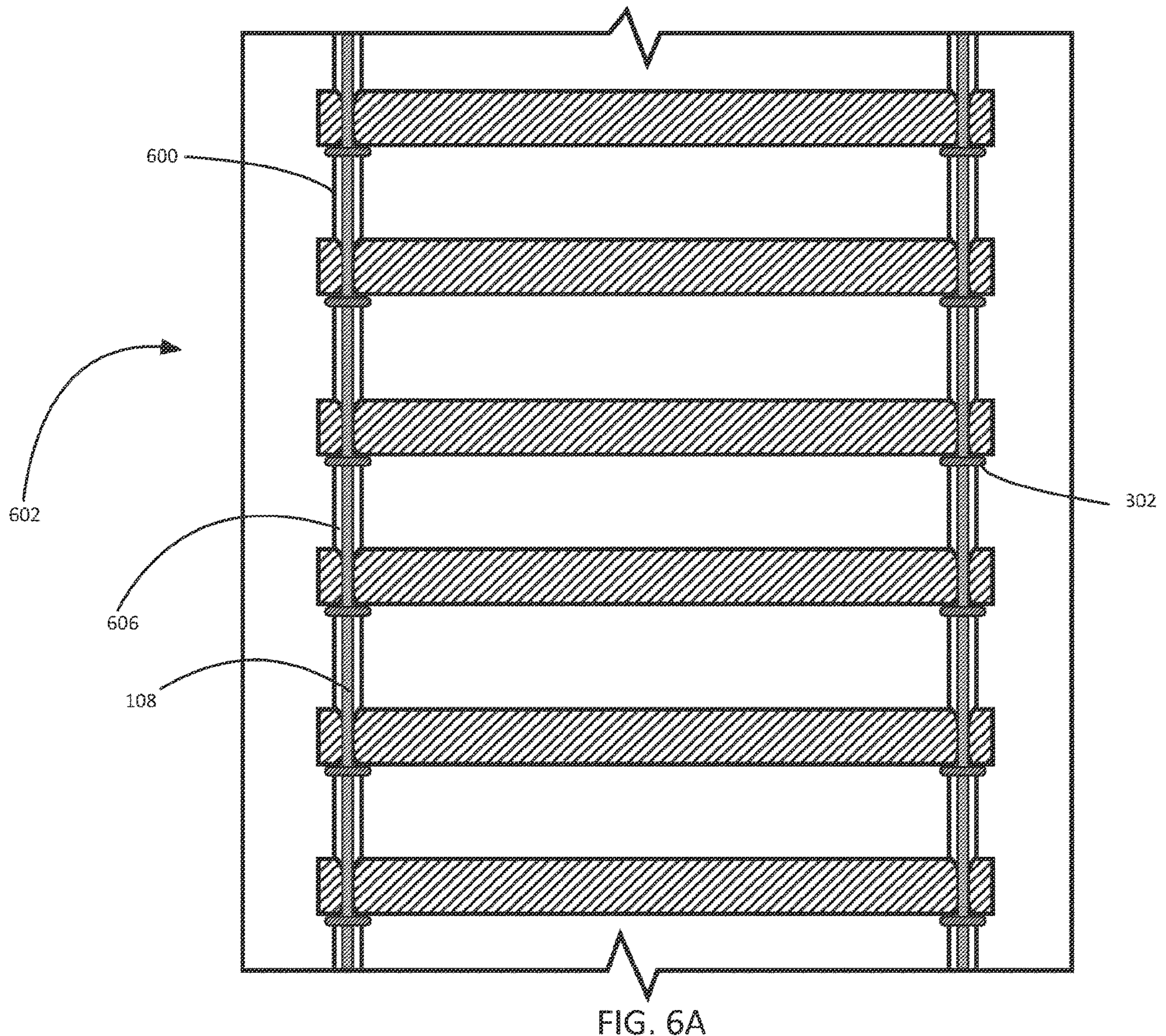
FIGS. 6A and 6B are cross-sectional views of a capture structure in collection and release configurations, respectively.
Figure 6B:
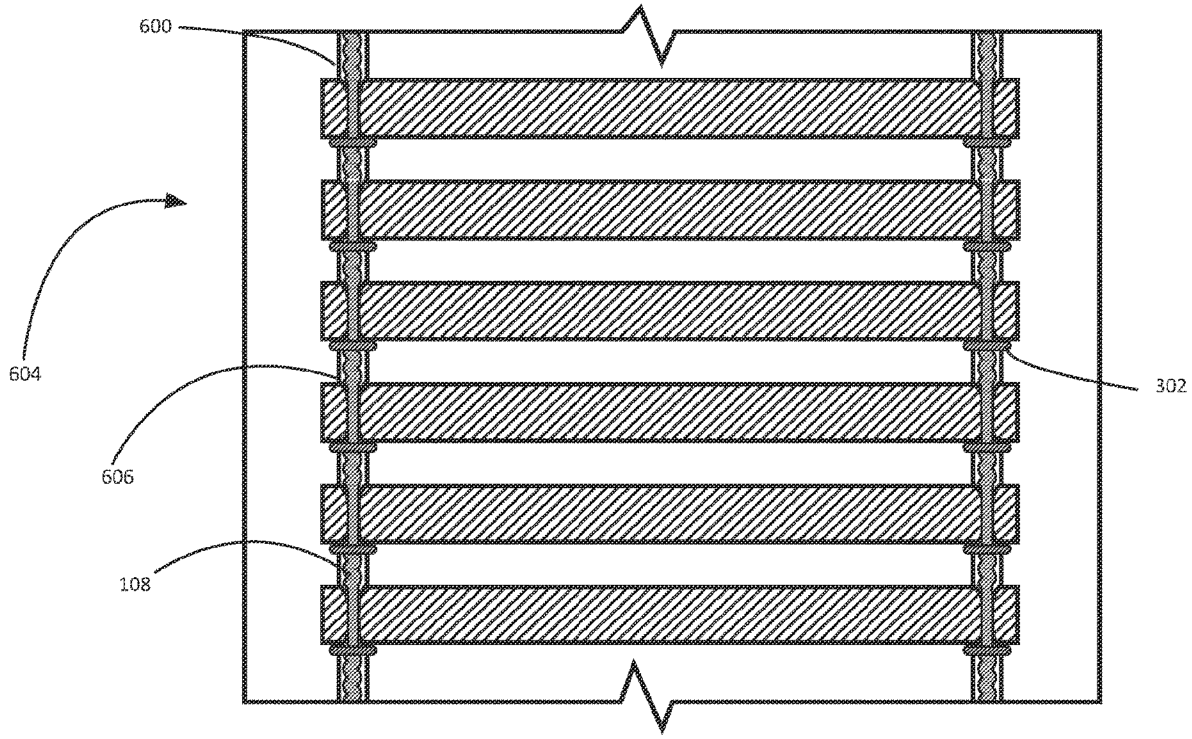

In some embodiments, the straps 108 may be directly exposed to the disks 110, the couplings, and/or the elements. In other embodiments, including the non-limiting example shown in FIGS. 6A and 6B, the strap 108 may be enclosed in a sock or sleeve 600 that runs the length of the strap 108. FIGS. 6A and 6B are cross-sectional views of non-limiting example of a capture structure 106 in collection 118 and release 120 configurations, respectively. As shown, each strap 108 is enclosed in a sleeve 600. In some embodiments, the sleeve 600 may be composed of an elastic material 504 capable of stretching. In other embodiments, the sleeve 600 may be composed of other materials. For example, in one embodiment, the sleeve 600 may be composed of material that is resistant to UV radiation, which may help prolong the life of the straps 108 without having to sacrifice their strength to size ratio. Those skilled in the art will recognize that the sleeve 600 may be composed of other materials that would make the device 100 better adapted for certain environments (e.g., caustic environments where the collection device 100 is being used to capture carbon dioxide exhausted from an industrial process, etc.).

In some of the embodiments where the sleeves 600 are composed of an elastic material 504, the sleeves 600 may be biased to shrink from an elongated state 602 corresponding to the capture structure 106 being in the collection configuration 118 (i.e., FIG. 6A) to a relaxed state 604 corresponding to the capture structure 106 being in the release configuration 120 (i.e., FIG. 6B). In some of these embodiments, the sleeved straps pass through the disks 110 via apertures 300 in the disks 110. According to various embodiments, the apertures 300 of the stacked disks 110 may align to define a corridor 606 running the height of the stack. According to various embodiments, including the non-limiting example shown in FIG. 6B, the relaxed state 604 of the sleeve 600 is contained within that corridor 606 bounded by the apertures 300 that the strap 108 passes through, such that when the capture structure 106 is in the release configuration 120, the release topologies 206 for that strap 108 comprise the connecting segments 204 being contained within the corridor 606 by the sleeve 600. Such a release topology 206 avoids the problems presented by the outward and inward folding embodiments, as discussed above. It does not require additional space in the void 212 increasing the size of the release chamber 102, nor does it require any grooves 304 in the disks 110 that reduce the surface area of the sorbent material 112.

The contemplated sleeves 600 provide several advantages. The use of sleeves 600 can make it possible to completely protect the resulting vertical channel and the strap 108 within it by using thin textile materials that can be stretched to accommodate the extended version of the disk 110 stack. The sleeve 600 could protect the strap 108 from UV, moisture, or other elements that could be detrimental to strap 108 integrity. Additionally, the sleeve 600 would prevent debris from entering the channel. In some embodiments, the sleeve 600 could be self-supporting like a sock, while in others it could have an embedded coil that adds some stiffness.

Figure 7A:
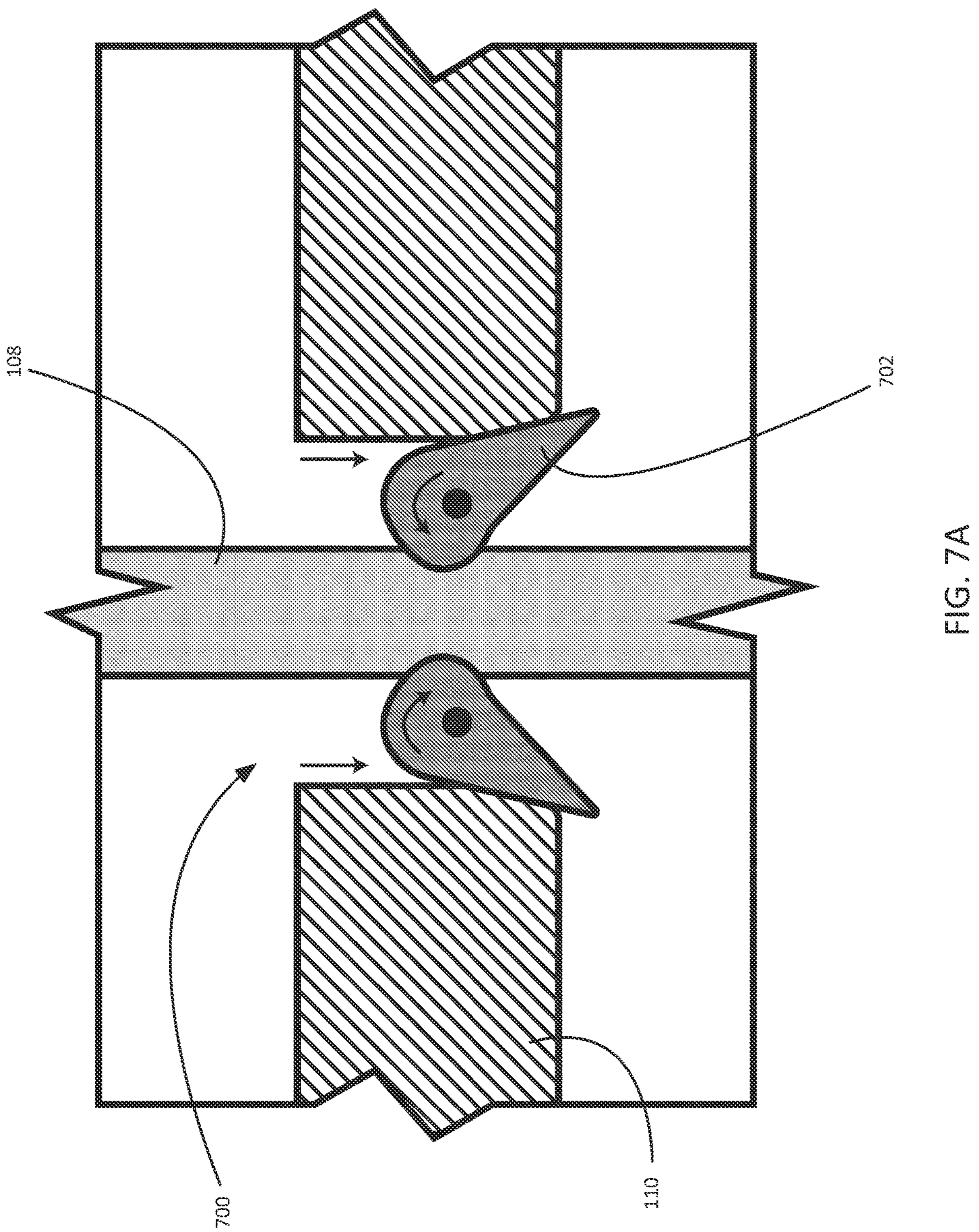
FIGS. 7A and 7B are cross-sectional views of a strap and a releasable coupling in the engaged and disengaged states, respectively.
Figure 7B:
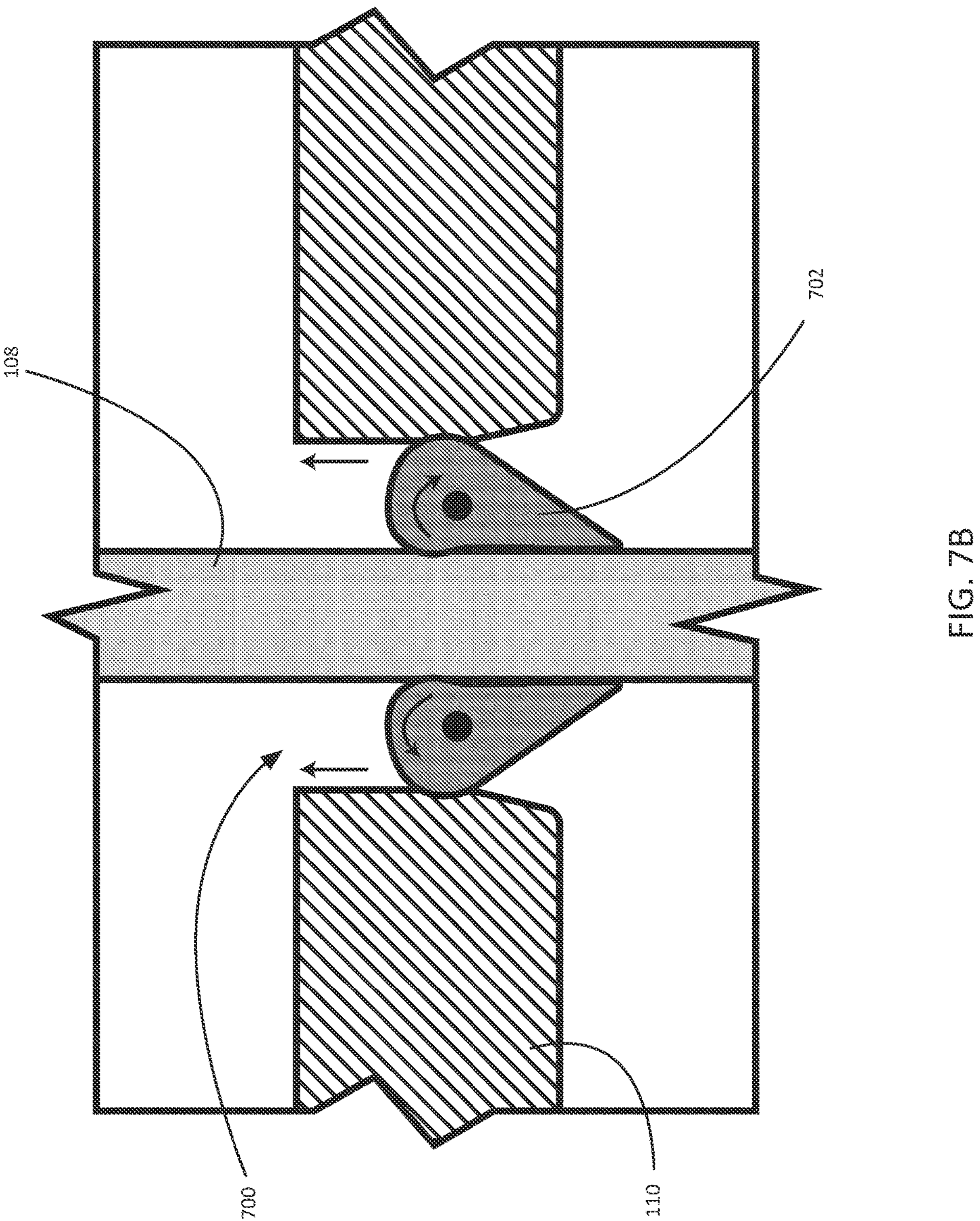

FIGS. 7A and 7B show cross-sectional views of a non-limiting example of a releasable coupling located inside an aperture 300 in engaged and disengaged state, respectively. Specifically, this releasable coupling is a self-tightening clamp 700. As shown, the strap 108, passes between two rotating wedges 702 that have textured surfaces that grip the strap 108. As the texture engages with the strap 108, the wedges 702 rotate inward to pinch the strap 108. See FIG. 7A. The higher the weight of the disk 110 pushing down on the clamp 700, the tighter the clamp 700 grabs on to the strap 108. According to various embodiments, this clamp 700 may be disengaged by lifting the disk 110 up (i.e., FIG. 7B), rotating the wedges 702 in the direction of the motion of the strap 108 relative to the disk 110 until they are no longer pinching the strap 108, allowing the strap 108 to slide freely so long as the wedges 702 are held open. This makes it possible to adjust the height of the disk 110 on the strap 108. Once the weight has been removed, the clamp 700 can slide to a better position, where it is locked down again. This is similar to the clamps used on cargo straps, but it can be much more light weight, as it only has to hold the weight of a single disk 110.

Where the above examples, embodiments and implementations reference examples, it should be understood by those of ordinary skill in the art that other passive collection devices having suspended sorbent disks could be intermixed or substituted with those provided. In places where the description above refers to particular embodiments of collection device, sorbent disks, and straps, it should be readily apparent that a number of modifications may be made without departing from the spirit thereof and that these embodiments and implementations may be applied to other suspended sorbent disk collection technologies as well. Accordingly, the disclosed subject matter is intended to embrace all such alterations, modifications and variations that fall within the spirit and scope of the disclosure and the knowledge of one of ordinary skill in the art.

What is claimed is:

1. A passive carbon dioxide collection device, comprising:

a release chamber;

a capture structure coupled to the release chamber and comprising at least three straps and a plurality of disks coupled to and spaced along the at least three straps, each disk comprising a sorbent material, the capture structure being movable between a collection configuration and a release configuration, and each strap comprising a primary width and a secondary width, the secondary width at least an order of magnitude smaller than the primary width;

a movable portion configured to move the capture structure between the collection configuration and the release configuration;

wherein the collection configuration comprises the capture structure extending upward from the release chamber, the plurality of disks suspended from the movable portion by the at least three straps such that, for each pair of neighboring disks of the plurality of disks having a lower disk and an upper disk and for each strap of the at least three straps the lower disk is separated from the upper disk by a connecting segment of the strap, exposing at least a portion of the capture structure to an airflow and allowing the sorbent material of the plurality of disks to capture carbon dioxide;

wherein the release configuration comprises the plurality of disks being stacked entirely within the release chamber for regeneration resulting in the release of the carbon dioxide sorbed into the sorbent material, each strap of the at least three straps being collapsed, each connecting segment having assumed a release topology, the release topology sized and positioned to accommodate the stacking of the plurality of disks entirely within the release chamber; and wherein, for each pair of neighboring disks of the plurality of disks and for each strap of the at least three straps, the connecting segment is biased to move toward the release topology when the lower disk is not entirely supported by the at least three straps.

2. The passive carbon dioxide collection device of claim 1 wherein, while in the release configuration, the plurality of disks are stacked in the release chamber such that a gap between neighboring disks is no greater than three times the secondary width, the gap being the largest vertical distance between neighboring disks.

3. The passive carbon dioxide collection device of claim 1, wherein the plurality of disks is releasably coupled to the at least three straps.

4. The passive carbon dioxide collection device of claim 3, wherein, for each disk of the plurality of disks, each strap of the at least three straps is releasably coupled to an edge of the disk by a belt skirting the disk, pressing the strap into the edge and releasably coupling the strap to the disk.

5. The passive carbon dioxide collection device of claim 3, wherein, for each disk of the plurality of disks and for each strap of the at least three straps, the disk comprises an aperture for the strap, the strap passing through the disk, the disk releasably coupled to the strap proximate the aperture.

6. The passive carbon dioxide collection device of claim 5, wherein, for each disk of the plurality of disks and for each strap of the at least three straps, the strap is releasably coupled to the disk through a self-tightening clamp at least partially inside the aperture of the disk the strap passes through.

7. The passive carbon dioxide collection device of claim 6, wherein each self-tightening clamp is disengaged from and made movable with respect to the strap by lifting the disk upward with respect to the strap.

8. The passive carbon dioxide collection device of claim 7, wherein the self-tightening clamp comprises two rotating wedges that are textured, the strap passing between the two rotating wedges such that an upward motion of the strap with respect to the self-tightening clamp causes the rotating wedges to rotate in a direction of the upward motion of the strap, pinching the strap and releasably coupling the disk to the strap.

9. The passive carbon dioxide collection device of claim 5, wherein, for each disk in the plurality of disks and for each strap of the at least three straps, the disk is coupled to the strap through a stopper releasably coupled to the strap beneath the disk, the stopper being too large to enter the aperture the strap is passing through.

10. The passive carbon dioxide collection device of claim 1, wherein each strap of the at least three straps is enclosed in a different sleeve, each sleeve composed of an elastic material and is biased to shrink from an elongated state corresponding to the capture structure being in the collection configuration to a relaxed state corresponding to the capture structure being in the release configuration.

11. The passive carbon dioxide collection device of claim 10, wherein, for each strap of the at least three straps, the relaxed state of the sleeve is contained within a corridor bounded by apertures passing through the plurality of disks such that when the capture structure is in the release configuration, the release topology comprises the strap being contained within the corridor by the sleeve.

12. The passive carbon dioxide collection device of claim 1, wherein, for each pair of neighboring disks of the plurality of disks and for each strap of the at least three straps, the release topology of the connecting segment of the strap comprises the connecting segment folding to form a fold edge that is sandwiched between the upper disk and lower disk.

13. The passive carbon dioxide collection device of claim 12, wherein, for each pair of neighboring disks of the plurality of disks, at least one of the upper disk and the lower disk comprises a groove sized and located to at least partially receive the connecting segment when in the release topology.

14. The passive carbon dioxide collection device of claim 1, wherein, for each pair of neighboring disks of the plurality of disks and for each strap of the at least three straps, the release topology of the connecting segment of the strap comprises the connecting segment folding to form a fold edge that is in a void between the plurality of disks and the release chamber.

15. The passive carbon dioxide collection device of claim 1, wherein, for each strap of the at least three straps, the strap comprises a uniform strap, and each connecting segment of the strap comprises the uniform strap coupled to at least one biasing strap.

16. The passive carbon dioxide collection device of claim 15, wherein the at least one biasing strap is composed of an elastic material.

17. The passive carbon dioxide collection device of claim 15 wherein, for each strap of the at least three straps, each connecting segment of the strap comprises two biasing straps separated by a break.

18. The passive carbon dioxide collection device of claim 1, wherein the at least three straps pass through the plurality of disks, the primary width of each strap having an orientation with respect to a radius of the disk bisecting the primary width, and wherein the orientation of the primary width destroy a rotational symmetry of the capture structure, hindering spinning caused by the airflow.

19. The passive carbon dioxide collection device of claim 1, wherein the at least three straps pass through the plurality of disks in a tangential fashion, the primary width of each strap having an orientation with respect to a radius of the disk bisecting the primary width, and wherein the orientation of the primary width is closer to perpendicular to the radius than parallel with the radius.

20. The passive carbon dioxide collection device of claim 1, wherein the at least three straps pass through the plurality of disks in a radial fashion, the primary width of each strap having an orientation with respect to a radius of the disk bisecting the primary width, and wherein the orientation of the primary width is closer to parallel with the radius than perpendicular to the radius.

* * * * *